US012664785B2

(12) United States Patent
Oh et al.

(10) Patent No.: US 12,664,785 B2
(45) Date of Patent: Jun. 23, 2026

(54) SYSTEM AND METHOD FOR PREDICTING PEDESTRIAN SAFETY INFORMATION BASED ON VIDEO

(71) Applicant: ELECTRONICS AND TELECOMMUNICATIONS RESEARCH INSTITUTE, Daejeon (KR)

(72) Inventors: Sungchan Oh, Daejeon (KR); Daehoe Kim, Daejeon (KR); Je-Seok Ham, Daejeon (KR); Jin Young Moon, Daejeon (KR); Yongjin Kwon, Daejeon (KR); Jonghee Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 69 days.

(21) Appl. No.: 18/770,900

(22) Filed: Jul. 12, 2024

(65) Prior Publication Data

US 2025/0037469 A1     Jan. 30, 2025

(30) Foreign Application Priority Data

Jul. 27, 2023    (KR) ........................ 10-2023-0098385
Jan. 3, 2024    (KR) ........................ 10-2024-0000781

(51) Int. Cl.
*G06V 20/52*    (2022.01)
*G06V 10/77*    (2022.01)
    (Continued)

(52) U.S. Cl.
CPC .......... *G06V 20/52* (2022.01); *G06V 10/7715* (2022.01); *G06V 10/82* (2022.01);
    (Continued)

(58) Field of Classification Search
None
See application file for complete search history.

(56) References Cited

U.S. PATENT DOCUMENTS 9,251,708 B2    2/2016 Rosenbaum et al.
9,996,749 B2    6/2018 Bataller et al.
    (Continued)

FOREIGN PATENT DOCUMENTS

KR        10-1947280 B1    5/2019
KR    10-2019-0062184 A    6/2019
    (Continued)

OTHER PUBLICATIONS

Yang et al. "Predicting Pedestrian Crossing Intention With Feature Fusion and Spatio-Temporal Attention", Oct. 13, 2021, IEEE Transactions on Intelligent Vehicles, vol. 7, No. 2, pp. 221-230 (Year: 2021).*
    (Continued)

*Primary Examiner* — James M Anderson, II
(74) *Attorney, Agent, or Firm* — LRK PATENT LAW FIRM

(57)    ABSTRACT

A method and apparatus for predicting pedestrian safety information based on video is disclosed. Pedestrian trajectory prediction data based on video input is first generated. Then, pedestrian behavior prediction data based on the video input is generated. A potential risk to pedestrian safety is estimated based on the pedestrian trajectory prediction data, the pedestrian behavior prediction data, and a surface classification data in the video data.

16 Claims, 23 Drawing Sheets

(51) Int. Cl.

| | | |
|---|---|---|
| *G06V 10/82* | (2022.01) | |
| *G06V 20/40* | (2022.01) | |
| *G06V 40/10* | (2022.01) | |
| *G06V 40/20* | (2022.01) | |
| *H04N 7/18* | (2006.01) | |

(52) U.S. Cl.
  CPC .............. *G06V 20/41* (2022.01); *G06V 20/46* (2022.01); *G06V 20/49* (2022.01); *G06V 40/10* (2022.01); *G06V 40/20* (2022.01); *H04N 7/183* (2013.01)

(56) References Cited

U.S. PATENT DOCUMENTS

| | | | |
|---|---|---|---|
| 11,163,989 | B2 | 11/2021 | Sun et al. |
| 11,205,082 | B2 | 12/2021 | Adeli-Mosabbeb et al. |
| 11,403,343 | B2 | 8/2022 | Fukushima et al. |
| 11,468,676 | B2 | 10/2022 | Rawat et al. |
| 11,487,999 | B2 | 11/2022 | Le et al. |
| 11,631,239 | B2 | 4/2023 | Yang et al. |
| 11,840,261 | B2 | 12/2023 | Hartmann et al. |
| 11,934,454 | B2 | 3/2024 | Wang et al. |
| 2012/0081542 | A1 | 4/2012 | Suk et al. |
| 2015/0084791 | A1 | 3/2015 | Jang |
| 2022/0327834 | A1 | 10/2022 | Liu et al. |
| 2022/0332349 | A1* | 10/2022 | Benou ................... G06F 18/214 |
| 2024/0359709 | A1* | 10/2024 | Hoevel ............. B60W 60/0027 |

FOREIGN PATENT DOCUMENTS

| | | |
|---|---|---|
| KR | 10-1958868 B1 | 7/2019 |
| KR | 10-1979375 B1 | 8/2019 |
| KR | 10-2139524 B1 | 7/2020 |
| KR | 10-2020-0103194 A | 9/2020 |
| KR | 10-2021-0126313 A | 10/2021 |
| KR | 10-2310434 B1 | 10/2021 |
| KR | 10-2325029 B1 | 11/2021 |
| KR | 10-2336258 B1 | 12/2021 |
| KR | 10-2022-0013164 A | 2/2022 |
| WO | 2020/062032 A1 | 4/2020 |
| WO | 2020/114780 A1 | 6/2020 |

OTHER PUBLICATIONS

Anonymous AVSS submission for Double Blind Review, "PedRiskNet: Classifying Pedestrian Situations in Surveillance Videos for Pedestrian Safety Monitoring in Smart Cities", AVSS 2023 Submission #43.

Anonymous AVSS submission, "Trajectory Prediction using Attentive Visual Features", AVSS 2019 Submission #76.

Je-Seok Ham et al., "CIPF: Crossing Intention Prediction Network based on Feature Fusion Modules for Improving Pedestrian Safety," 2023 IEEE/CVF Conference on Computer Vision and Pattern Recognition Workshops (CVPRW), Vancouver, BC, Canada, Jun. 17-24, 2023.

Amir Rasouli et al., "PIE: A Large-Scale Dataset and Models for Pedestrian Intention Estimation and Trajectory Prediction", Proceedings of the IEEE_CVF International Conference on Computer Vision (ICCV), 2019, pp. 6262-6271 (Oct. 27, 2019).

Amir Rasouli et al., "Pedestrian Action Anticipation using Contextual Feature Fusion in Stacked RNNs", arXiv:2005.06582_cs.CV_ May 13, 2020.

Dongfang Yang et al., "Predicting Pedestrian Crossing Intention With Feature Fusion and Spatio Temporal Attention", IEEE Transactions on Intelligent Vehicles, vol. 7, No. 2, pp. 221-230, Jun. 2022.

Byeongjoon Noh et al., "Vision-Based Pedestrian's Crossing Risky Behavior Extraction and Analysis for Intelligent Mobility Safety System", Sensors 2022, 22(9), 3451 (Apr. 30, 2022).

* cited by examiner

110 — COMMUNICATION MODULE ◄—► PROCESSOR — 130

MEMORY — 120

Figure 2:
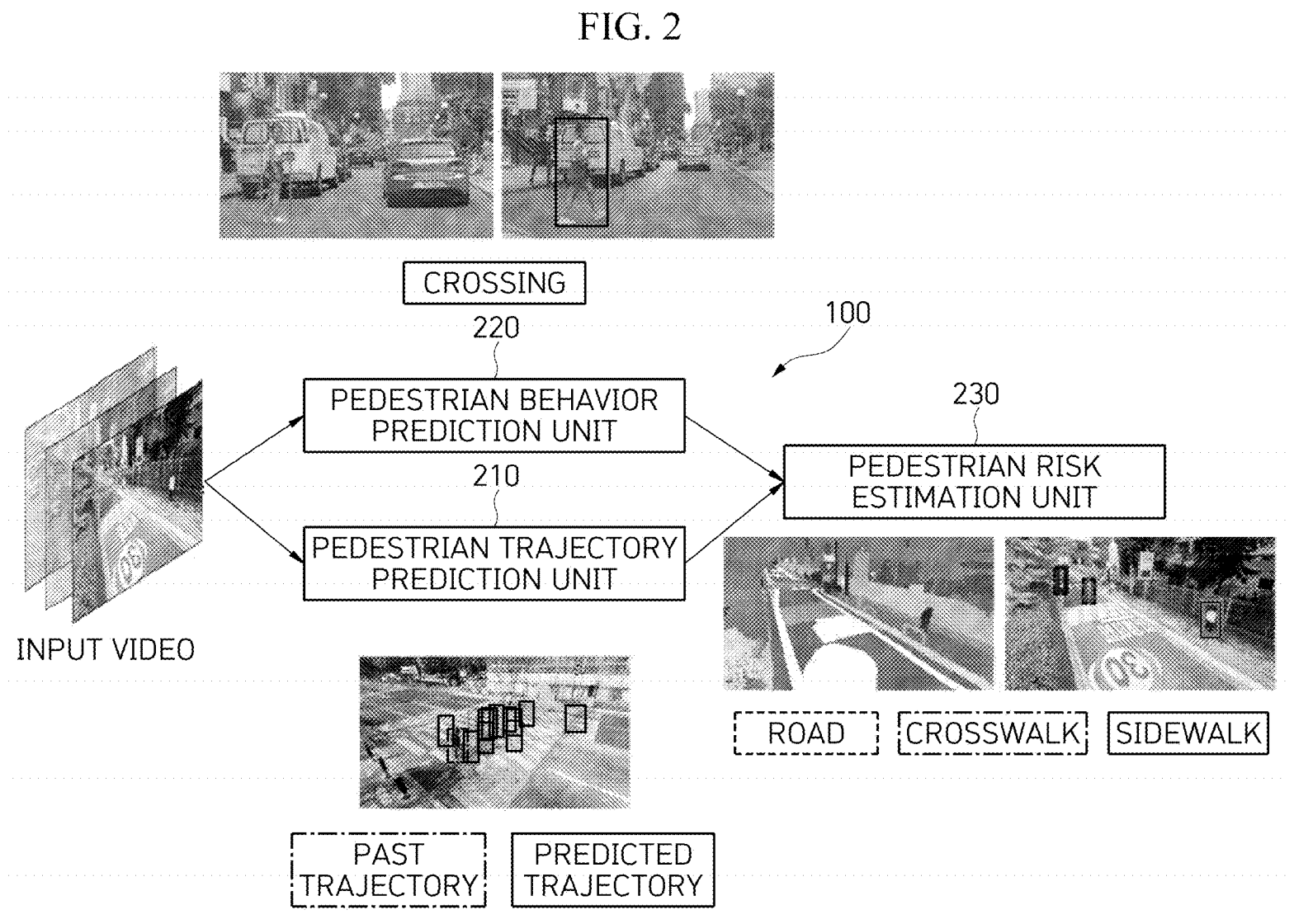

PEDESTRIAN RISK ESTIMATION UNIT

SIDEWALK

CROSSWALK

ROAD

CROSSING

220

PEDESTRIAN BEHAVIOR PREDICTION UNIT

210

PEDESTRIAN TRAJECTORY PREDICTION UNIT

PREDICTED TRAJECTORY

PAST TRAJECTORY

INPUT VIDEO

FIG. 4

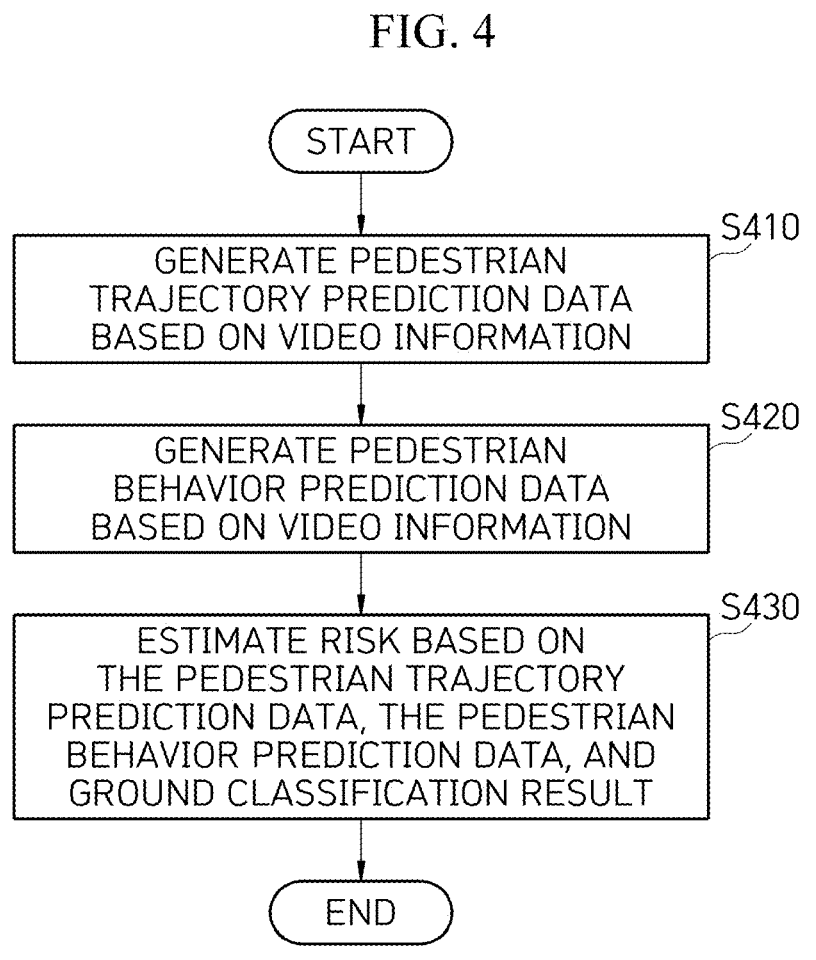

START

GENERATE PEDESTRIAN
TRAJECTORY PREDICTION DATA
BASED ON VIDEO INFORMATION
S410

GENERATE PEDESTRIAN
BEHAVIOR PREDICTION DATA
BASED ON VIDEO INFORMATION
S420

ESTIMATE RISK BASED ON
THE PEDESTRIAN TRAJECTORY
PREDICTION DATA, THE PEDESTRIAN
BEHAVIOR PREDICTION DATA, AND
GROUND CLASSIFICATION RESULT
S430

END

Figure 6:
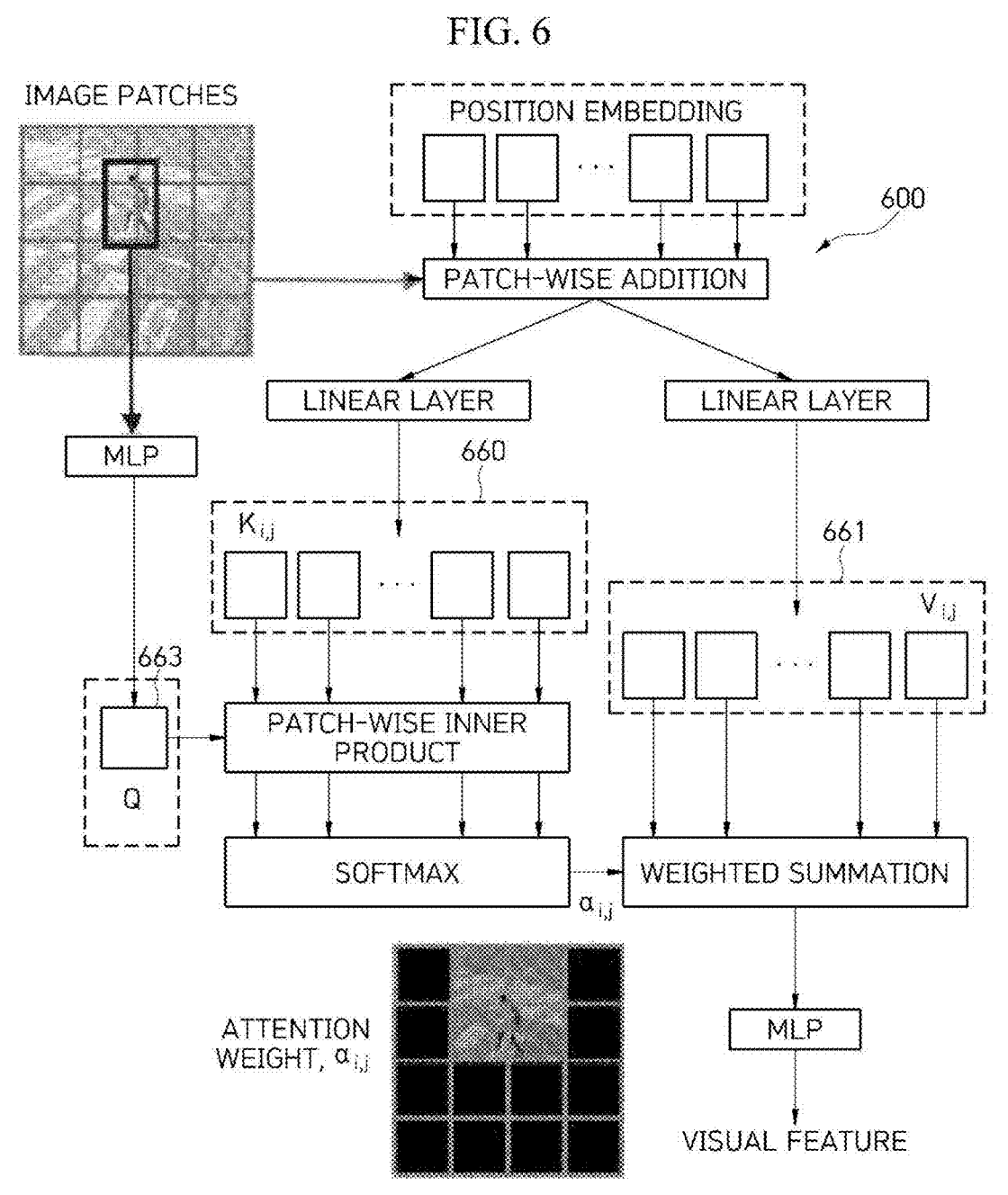

IMAGE PATCHES

POSITION EMBEDDING

600

PATCH-WISE ADDITION

LINEAR LAYER

LINEAR LAYER

660

MLP $K_{i,j}$

661

$V_{i,j}$

663

Q

PATCH-WISE INNER PRODUCT

SOFTMAX $\alpha_{i,j}$

WEIGHTED SUMMATION

ATTENTION WEIGHT, $\alpha_{i,j}$

MLP

VISUAL FEATURE

FIG. 8

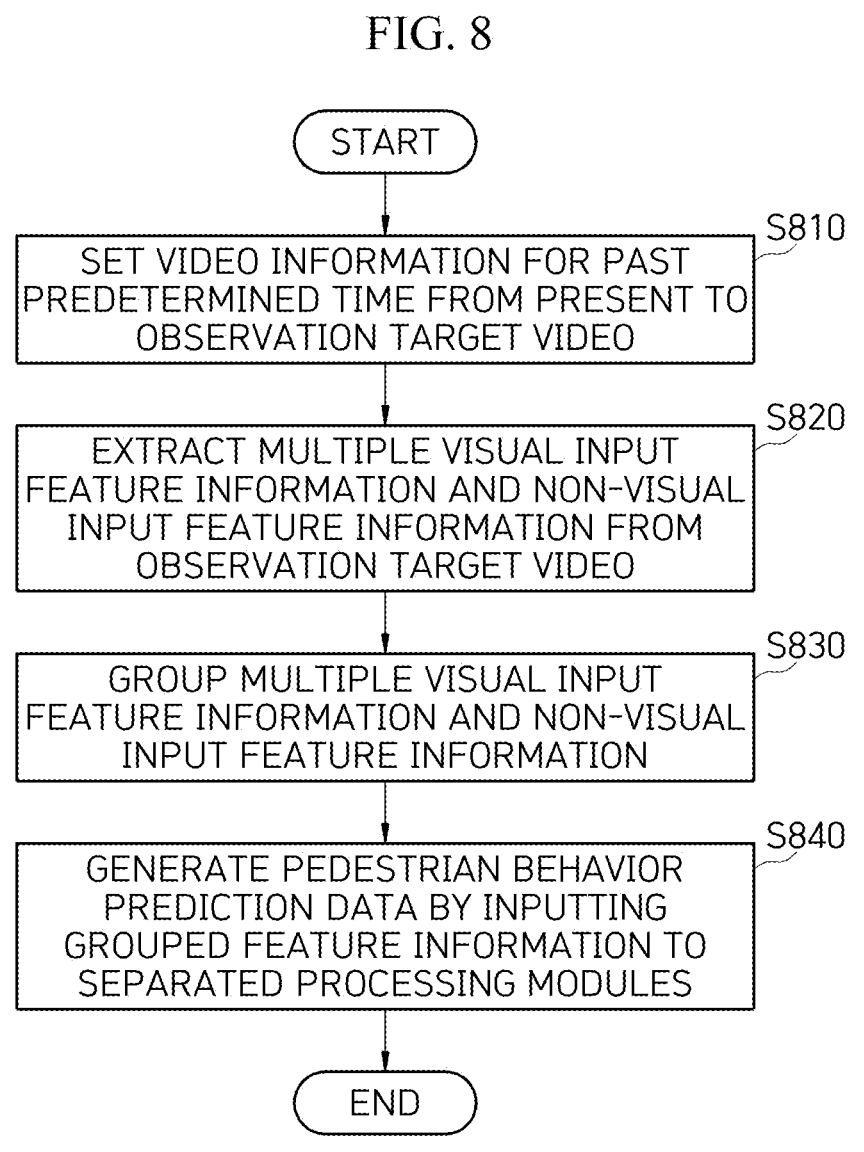

START

S810
SET VIDEO INFORMATION FOR PAST PREDETERMINED TIME FROM PRESENT TO OBSERVATION TARGET VIDEO

S820
EXTRACT MULTIPLE VISUAL INPUT FEATURE INFORMATION AND NON-VISUAL INPUT FEATURE INFORMATION FROM OBSERVATION TARGET VIDEO

S830
GROUP MULTIPLE VISUAL INPUT FEATURE INFORMATION AND NON-VISUAL INPUT FEATURE INFORMATION

S840
GENERATE PEDESTRIAN BEHAVIOR PREDICTION DATA BY INPUTTING GROUPED FEATURE INFORMATION TO SEPARATED PROCESSING MODULES

END

FIG. 10

START

RECEIVE VIDEO CAPTURED
BY CCTV CAMERA — S1110

GENERATE BOUNDING BOX FOR
PEDESTRIAN EXISTING IN THE VIDEO — S1120

GENERATE SEGMENTATION MAPS
BY PERFORMING SEMANTIC
SEGMENTATION FOR THE VIDEO — S1130

GENERATE GROUND AREA MAP BY
IDENTIFYING GROUND AREA AMONG
THE SEGMENTATION MAPS — S1140

ESTIMATE SEMANTIC LOCATION
INFORMATION FOR THE PEDESTRIAN — S1150

END 1310          1320          1330 h(1510)

0.1h(1520)

ROAD     CROSSWALK     SIDEWALK 1610          1620          1630

: SAFE PEDESTRIAN

: PEDESTRIAN VULNERABLE TO ACCIDENT

————— : SAFE STATE(2410)

---------- : RISKY STATE(2420)

SYSTEM AND METHOD FOR PREDICTING PEDESTRIAN SAFETY INFORMATION BASED ON VIDEO

CROSS-REFERENCE TO RELATED APPLICATION

This application claims priority to and the benefit of Korean Patent Application No. 10-2023-0098385, filed on Jul. 27, 2023, and Korean Patent Application No. 10-2024-0000781, filed on Jan. 3, 2024, the disclosure of which is incorporated herein by reference in its entirety.

BACKGROUND

1. Technical Field

The present disclosure relates to a system and a method for predicting pedestrian safety information based on video.

2. Related Art

In an intelligent video analysis system, object detection and tracking schemes have been used as an essential constituent element, and image segmentation algorithms are frequently employed.

However, according to such technology, since risk is assessed after observation with a camera, it is not appropriate in cases where proactive actions, such as accident prevention by warnings, are needed.

Further, when a traffic accident warning system is constituted using only past and current locations of an object, the traffic accident warning system will be oversensitive and thus will generate frequent false alarms in order to achieve target accident prevention rate.

Further, most of the prior arts of trajectory prediction use only coordinate data or visual feature data summarized by average pooling.

In addition, since the prior arts related to pedestrian behavior prediction are based on image data, vehicle sensors, and the like, they have problems in that their prediction accuracy is insufficient.

SUMMARY

To address the issues mentioned earlier, an objective of the present disclosure is to propose a system and method for predicting pedestrian safety information based on video analysis, which can estimate future trajectory, behavior, and potential risk of a pedestrian in advance of potential accidents. The prediction enables proactive action to be taken to mitigate risks that may occur in the future, in situations where there is risk of accident in a traffic environment.

However, the objective of the present disclosure is not limited to the above-described objective, and other objectives may exist.

In order to solve the above problem, according to a first embodiment of the present disclosure, a method for predicting pedestrian safety information based on video includes: generating pedestrian trajectory prediction data based on video; generating pedestrian behavior prediction data based on the video; and estimating risk to pedestrian safety based on the trajectory prediction data, the behavior prediction data, and a surface classification result for the video input.

In a second embodiment of the present disclosure, a system for predicting pedestrian safety information based on video includes: a communication module configured to receive video captured by a camera installed in a predetermined location; a memory configured to store a program to estimate a pedestrian risk based on the captured video; and a processor configured to: through execution of the program stored in the memory, generate pedestrian trajectory prediction data based on the video, generate pedestrian behavior prediction data based on the video, and estimate the risk based on the trajectory prediction data, the behavior prediction data, and a surface classification result in the video input.

In a third embodiment of the present disclosure, a system for predicting pedestrian safety based on video includes: a communication module configured to receive video captured by a camera installed in a predetermined location; a memory configured to store a program to estimate a pedestrian risk based on the captured video; and a processor configured to: through execution of the program stored in the memory, extract visual feature data for pedestrian trajectory prediction based on the video and generate pedestrian trajectory prediction data by inputting the visual feature data to recurrent encoder and decoder, extract multiple visual input feature data and non-visual input feature data from the video and generate pedestrian behavior prediction data by grouping and inputting the respective extracted input feature data to respective processing modules and then concatenating output results, and estimate pedestrian semantic location data and the potential risk based on the pedestrian trajectory prediction data, the pedestrian behavior prediction data, and a surface classification data from the video.

In order to solve the problems described above, according to another embodiment of the present disclosure, a computer program is concatenated with a hardware computer, executes a method for predicting pedestrian safety information based on video, and is stored in a computer-readable recording medium.

Other specific matters of the present disclosure are included in the detailed description and drawings.

Unlike a general traffic accident system that is mainly used to respond to a case where an accident has already occurred, an embodiment of the present disclosure makes more efficient pedestrian safety and accident prevention possible by focusing on the detection and prevention of an accident risk before the accident occurs through pedestrian trajectory prediction, pedestrian prediction, behavior and risk assessment.

Further, the present CCTV-based warning system generates a warning primarily based on the pedestrian location, and because of this, it has a problem in that false alarms occur frequently. However, according to an embodiment of the present disclosure, since a warning is generated through prediction of the trajectory, location, and risk, the false warning rate is decreased, and thus system reliability can be improved, and the incorrect warnings can be decreased.

Effects of the present disclosure are not limited to those described above, and other unmentioned effects will be able to be clearly understood by those of ordinary skill in the art from the following description.

BRIEF DESCRIPTION OF THE DRAWINGS

FIG. 1 is a block diagram of a system for predicting pedestrian safety information according to an embodiment of the present disclosure.

FIG. 2 is a diagram illustrating functional blocks of a system for predicting pedestrian safety information according to an embodiment of the present disclosure.

FIG. 4 is a flowchart illustrating a method for predicting pedestrian safety information according to an embodiment of the present disclosure.

FIG. 5 is a diagram explaining a process of generating pedestrian trajectory prediction data according to an embodiment of the present disclosure.

FIG. 6 is a diagram explaining the constitution of a attentive visual feature module according to an embodiment of the present disclosure.

FIG. 8 is a flowchart illustrating a method for generating pedestrian behavior prediction data according to an embodiment of the present disclosure.

FIG. 10 is a diagram explaining a detailed operation of each processing module for performing a method for generating pedestrian behavior prediction data according to an embodiment of the present disclosure.

DETAILED DESCRIPTION

Figure 3:
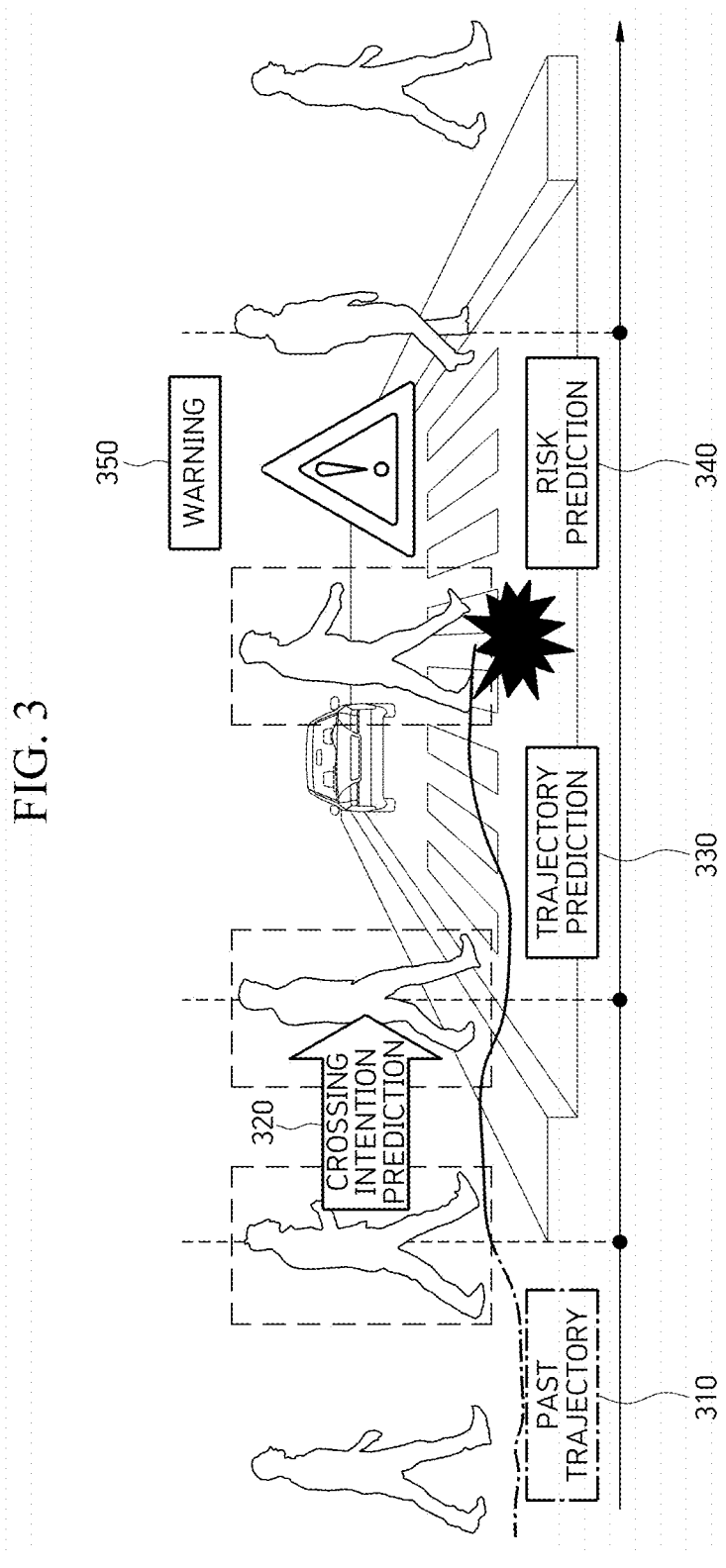
FIG. 3 is a diagram schematically explaining an operation of a system for predicting pedestrian safety information according to an embodiment of the present disclosure.

The aspects and features of the present disclosure and methods for achieving the aspects and features will be apparent by referring to embodiments to be described below in detail with reference to the accompanying drawings. However, the present disclosure is not limited to the embodiments disclosed below, and it can be implemented in various different forms. However, the embodiments are provided to complete the present disclosure and to assist those of ordinary skill in the art in a comprehensive understanding of the scope of the present disclosure, and the present disclosure is only defined by the scope of the appended claims.

Terms used in the description are to explain the embodiments, but are not intended to limit the present disclosure. In the description, unless specially described in the context, a singular form includes a plural form. In the description, the term "comprises" and/or "comprising" should be interpreted as not excluding the presence or addition of one or more other constituent elements in addition to the mentioned constituent elements. Throughout the whole description, the same reference numerals are used to indicate the same constituent elements, and the term "and/or" includes each of the mentioned constituent elements and all combinations of one or more thereof. The terms "first," "second," and so forth are used to describe various constituent elements, but these constituent elements should not be limited by the terms. The above-described terms are used only for the purpose of discriminating one constituent element from another constituent element. Accordingly, the first constituent element to be mentioned hereinafter may be the second constituent element in the technical idea of the present disclosure.

In this specification, 'pedestrian safety information' includes information regarding the degree of potential risk to pedestrian safety.

Unless otherwise defined, all terms (including technical and scientific terms) used in the description may be used as the meaning that can be commonly understood by those skilled in the art to which the present disclosure pertains. Further, unless clearly and specially defined, the terms defined in generally used dictionaries should not be interpreted ideally or excessively.

Figure 1:
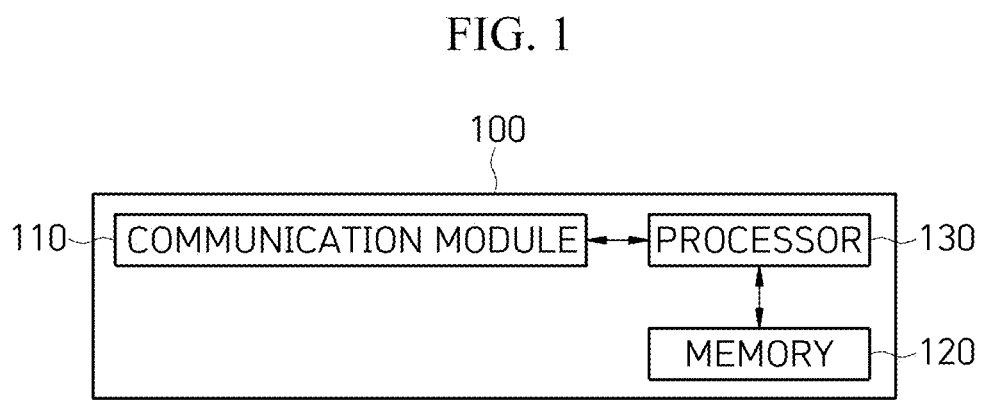

Hereinafter, a system for predicting pedestrian safety information based on video according to an embodiment of the present disclosure will be described in detail with reference to FIGS. 1 to 3.

FIG. 1 is a block diagram of a system for predicting pedestrian safety information according to an embodiment of the present disclosure. FIG. 2 is a diagram illustrating functional blocks of a system for predicting pedestrian safety information according to an embodiment of the present disclosure. FIG. 3 is a diagram schematically explaining the operation of a system for predicting pedestrian safety information according to an embodiment of the present disclosure.

A system 100 for predicting pedestrian safety information according to an embodiment of the present disclosure includes a communication module 110, a memory 120, and a processor 130.

The communication module 110 receives video captured by a camera, for example, a CCTV camera, installed in a predetermined location. The communication module 110 may include both a wired communication module and a wireless communication module. The wired communication module may be implemented by a power line communication device, a telephone line communication device, a cable groove (MoCA), an Ethernet, IEEE1294, an integrated wire groove network, and an RS-485 control device. Further, the wireless communication module may be composed of a module for implementing functions, such as wireless LAN (WLAN), Bluetooth, HDR WPAN, UWB, ZigBee, Impulse Radio, 60 GHZ WPAN, Binary-CDMA, wireless USB technology and wireless HDMI technology, other 5th generation (5G) communication, long term evolution-advanced (LTE-A), long term evolution (LTE), and wireless fidelity (Wi-Fi).

A program for estimating the risk to a pedestrian based on video data is stored in memory 120. Here, memory 120 collectively calls a nonvolatile storage device that continuously maintains stored data even without a power supply and a volatile storage device. For example, the memory 120 may be comprised of a NAND flash memory, such as a compact flash (CF) card, secure digital (SD) card, memory stick, solid-state drive (SSD), and micro SD card, a magnetic computer memory device, such as a hard disk drive (HDD), and an optical disc drive, such as CD-ROM and DVD-ROM.

Processor 130 may control at least one other constituent element (e.g., hardware or software constituent element) of system 100 for predicting pedestrian safety information. The Processor 130 may perform various data processing or operations by executing software, such as a program.

Meanwhile, in an embodiment of the present disclosure, the processor 130 may use at least one of machine learning, neural network, or deep learning algorithms as the artificial intelligence algorithm for predicting the pedestrian safety information but the invention is not limited thereto. As an example, at least one of the machine learning, neural network, or deep learning algorithms may be used as the artificial intelligence algorithm, and examples of the neural network may include models, such as convolutional neural network (CNN), deep neural network (DNN), and recurrent neural network (RNN).

In an embodiment of the present disclosure, artificial intelligence (AI) may be a technology that imitates human learning ability, inference ability, and perception ability and implements them by a computer. Artificial intelligence may be mainly comprised of machine learning and an element of technology utilizing machine learning. Machine learning may be an algorithm that extracts at least one learning data feature in order to classify input data. Further, technologies that copy functions of cognition and judgment in the human brain by utilizing the machine learning algorithm may also be understood to be in the artificial intelligence category. For example, technical fields of linguistic understanding, visual understanding, inference/prediction, knowledge expression, operation control, and so on may be included in the artificial intelligence category.

In an embodiment of the present disclosure, the artificial neural network may be designed to implement the human brain structure on the computer, may simulate neurons of the human neural network, and may include a plurality of network nodes having weight values. The plurality of network nodes may have a connection relationship with each other by simulating synaptic actions of the neurons where the neurons send and receive signals through synapses. In the artificial neural network, the plurality of network nodes may send and receive data in accordance with the convolutional connection relationship while being located on layers having different depths. The artificial neural network may be, for example, a convolutional neural network model or the like.

In the disclosure, the artificial neural network is a model learned in accordance with a predetermined machine learning method, and may be a model in which a weight for at least one network node included in an unlearned model is determined by the machine learning. Machine learning may mean that computer software improves the data processing ability through learning using data and data processing experience. The artificial neural network may be established by modeling the correlations between data, and the correlations may be expressed by a plurality of parameters. The artificial neural network may derive the correlations between the data by extracting and analyzing features from the given data, and optimization of the parameters of the artificial neural network by repeating such processes may be called machine learning. For example, the artificial neural network may learn mapping (correlations) between an input and an output with respect to the data given as a pair of input/output. Further, even in a case where only input data is given, the artificial neural network may learn the relationship between the given data by deriving regularity between the data. In the present disclosure, the "artificial neural network" may be interchangeably used with the terms "artificial neural network model" or "artificial intelligence algorithm".

Referring to FIG. 2, a system 100 for predicting pedestrian safety information according to an embodiment of the present disclosure includes a pedestrian trajectory prediction unit 210, a pedestrian behavior prediction unit 220, and a pedestrian risk estimation unit 230.

The pedestrian trajectory prediction unit 210 predicts the future location of a pedestrian based on the pedestrian's past trajectory and video input.

The pedestrian behavior prediction unit 220 determines the pedistrian's intention based on the video input. For example, the pedestrian behavior prediction unit 220 predicts whether the pedestrian will leave the sidewalk and cross the road.

The pedestrian risk estimation unit 230 estimates a final risk by synthesizing the future location through the trajectory prediction, the behavior prediction data, and the ground classification result from the video.

An embodiment of the present disclosure, as illustrated in FIG. 3, may predict the pedestrian's intention 320 and trajectory prediction location 330 based on a past trajectory 310, may estimate risk based on risk prediction 340, and may provide an appropriate risk warning 350 to a road user (e.g. driver), thereby preventing a traffic accident.

Hereinafter, referring to FIGS. 4 to 18, a method performed by the system 100 for predicting pedestrian safety information based on video according to an embodiment of the present disclosure will be described in detail.

FIG. 4 is a flowchart: illustrating a method for predicting pedestrian safety information according to an embodiment of the present disclosure.

A method for predicting pedestrian safety information according to an embodiment of the present disclosure includes: generating pedestrian trajectory prediction data based on video input (S410); generating pedestrian behavior prediction data based on the video input (S420); and estimating risk to pedestrian safety based on the trajectory prediction data, the behavior prediction data, and the surface classification result in the video input (S430).

Figure 5:
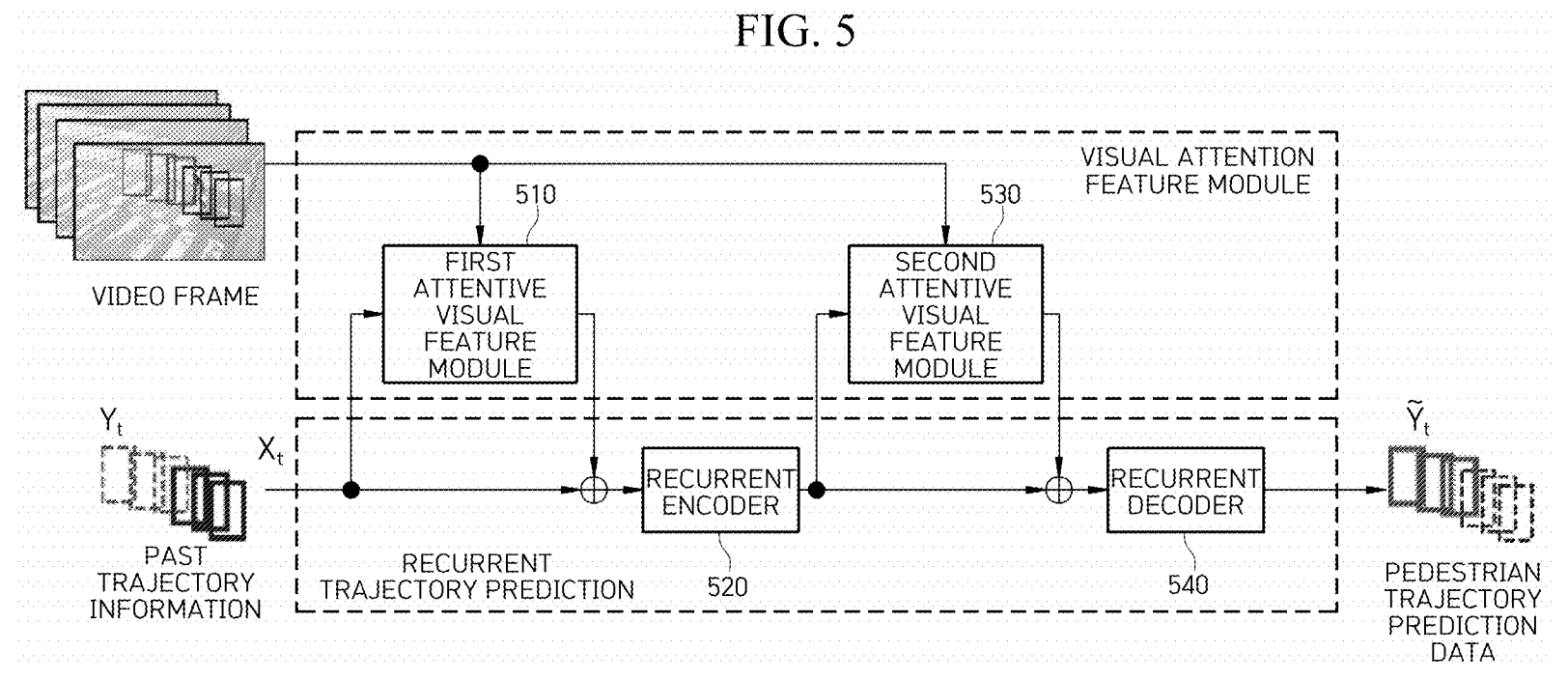

FIG. 5 is a diagram explaining the process of generating pedestrian trajectory prediction data according to an embodiment of the present disclosure. FIG. 6 is a diagram explaining the constitution of a attentive visual feature module according to an embodiment of the present disclosure.

First, in an embodiment of the present disclosure, the pedestrian trajectory prediction data is generated based on video input (S410).

In a known trajectory prediction method, a feature vector is extracted by a recurrent neural network encoder, receiving the past trajectory of an observed object as an input, and a future trajectory is predicted by using a recurrent neural network decoder. Throughout the trajectory prediction process video input is not used in most of existing methods. Further, even in case where the video input is used, the visual features of the entire area, such as convolution, max pooling, and average pooling, are used to summarize visual feature data in entire observation area, and thus, performance of such methods are limited.

In order to solve such problems by a trajectory prediction method according to an embodiment of the present disclosure, it is possible to provide visual features to the recurrent encoder and the recurrent decoder using the attention mechanism or the visual transformer.

Specifically, the video input and the pedestrian past trajectory data are input to a first attentive visual feature module 510 based on the attention mechanism, and a bounding box corresponding to a pedestrian in the video input and a pedestrian-surrounding area in the video of the bounding box are provided to a recurrent encoder 520. The first attentive visual feature module 510 may be referred to as pre-encoder AVF (attentive visual feature) module. The first attentive visual feature module 510 is located in front of the recurrent encoder 520 and its output is inputted into the recurrent encoder 520. The first attentive visual feature module 510 may provide visual feature data to the recurrent encoder 520. The first attentive visual feature module 510 may receive the observed individual video frame and the pedestrian location data (bounding box) as its input. The first attentive visual feature module 510 may extract visual information of the pedestrian and the area surrounding the pedestrian from the video (video frame).

The first attentive visual feature module (pre-encoder AVF) 510 takes the video and past trajectory of the pedestrian as input to provide the recurrent encoder 520 with visual feature data. Encoded feature data from the recurrent encoder 520 is inputted to the second attentive visual feature module (post-encoder AVF) 530. The recurrent decoder 540 takes concatenation of outputs of recurrent encoder 520 and the second attentive visual feature module (post-encoder AVF) 530 as input and generates the pedestrian trajectory prediction data as will be described below.

Meanwhile, a attentive visual feature module 600 according to an embodiment of the present disclosure follows the structure of vision transformer. In this case, the difference between the vision transformer and the attentive visual feature module 600 lies in an implementation of attention mechanism. In the case of the vision transformer, mutual attention values among all patch embeddings are computed.

In contrast, as illustrated in FIG. 6, the attentive visual feature module 600 according to an embodiment of the present disclosure, in order to extract only the feature of an area relevant to an input pedestrian trajectory prediction process, obtains a key (K, 660) and a value (V, 661) from the patch embedding of the video. The attentive visual feature module 600 calculates a query (0, 663) using the pedestrian bounding box and/or trajectory encoding feature data to reduce computational complexity. Next, pedestrian behavior prediction data is generated based on the video input (S420). Hereinafter, a process of generating pedestrian behavior prediction data according to an embodiment of the present disclosure will be described with reference to FIGS. 7 to 10. The description about the attentive visual feature module 600 may be applied to the attentive visual feature module 510 or the second attentive visual feature module 530.

Figure 7:
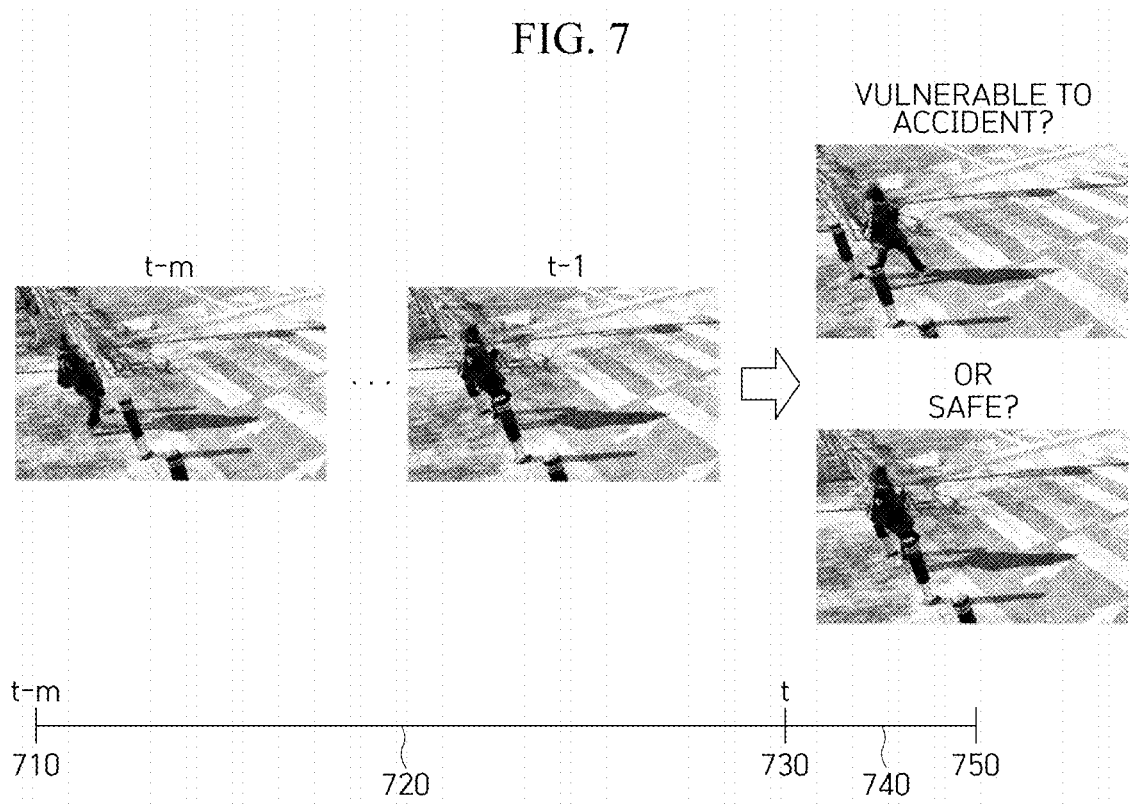
FIG. 7 is a diagram explaining an outline of generation of pedestrian behavior prediction data according to an embodiment of the present disclosure.

FIG. 7 is a diagram explaining an outline of generating pedestrian behavior prediction data according to an embodiment of the present disclosure.

Firstly, observation start time (experimental start frame) 710 is defined as m-th frame before the current time t. Observation data is collected during observation length m 720, from (t–m)-th frame to (t–1)-th frame.

Further, at critical time 730, prediction of pedestrian's future behavior, whether cross or not, is performed. That is, whether the pedestrian will get off the sidewalk and is going to be located on the road is predicted based on the observation data of the past frame. Meanwhile, prediction time 740 is defined as time gap between the critical frame 730 and crossing frame 750

If the model predicts that the pedestrian gets off of the sidewalk and crosses the road at the critical frame 730, and the pedestrian actually crosses the road at the crossing frame 750, this corresponds to a case where the model has predicted correctly. In contrast, if the pedestrian does not actually cross the road, this corresponds to a case where the model does not predict correctly.

FIG. 8 is a flowchart illustrating a method for generating pedestrian behavior prediction data according to an embodiment of the present disclosure.

A method for generating pedestrian behavior prediction data according to an embodiment of the present disclosure includes: setting video input for a predetermined time from the current to the past as an observation target video (S810); extracting multiple visual input feature data and non-visual input feature data from the observation target video (S820); grouping the multiple visual input feature data and the non-visual input feature data (S830); and generating the pedestrian behavior prediction data by inputting the grouped feature data to separated processing modules and concatenating output results of the respective processing modules (S840).

Figure 9:
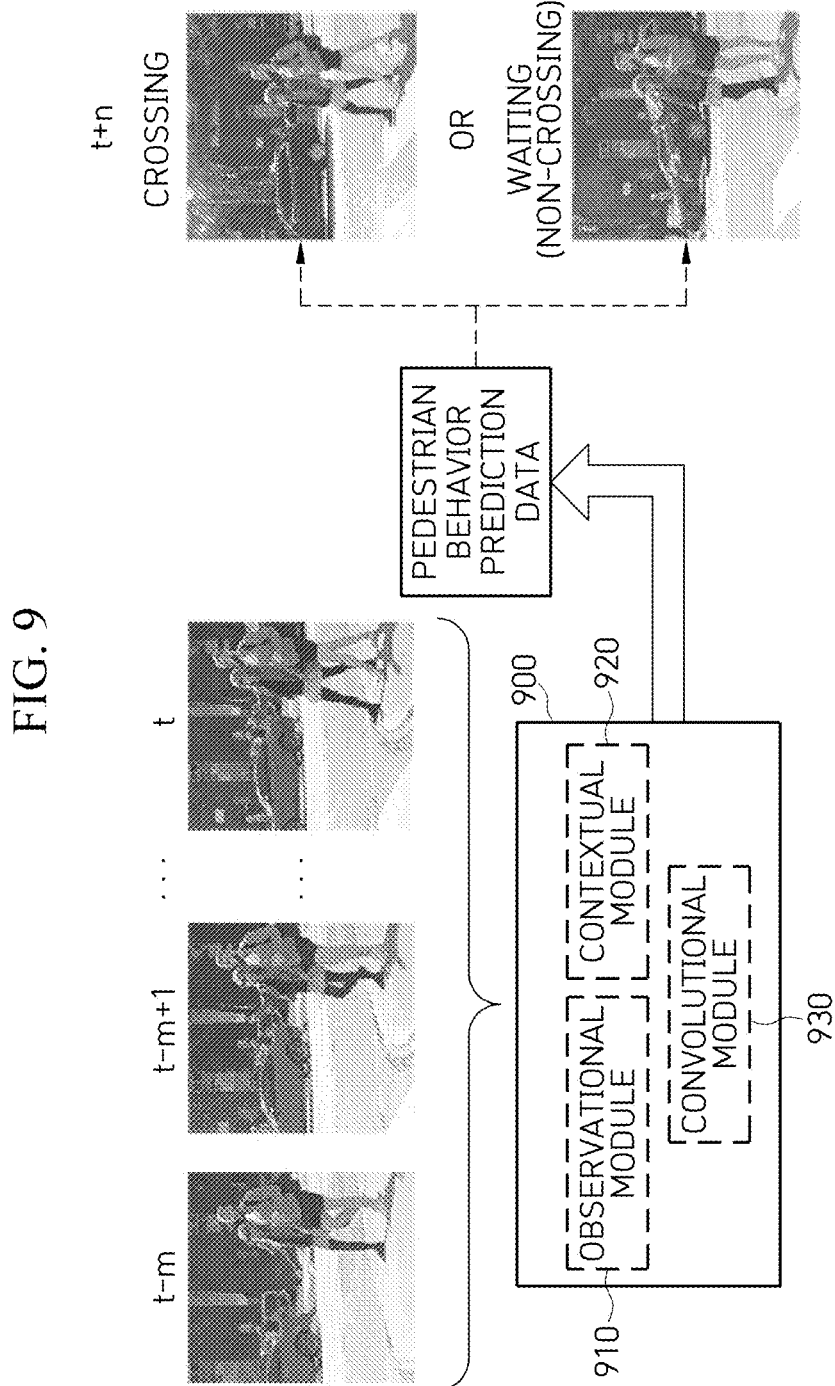
FIG. 9 is a diagram explaining each processing module for performing a method for generating pedestrian behavior prediction data according to an embodiment of the present disclosure.
Figure 10:
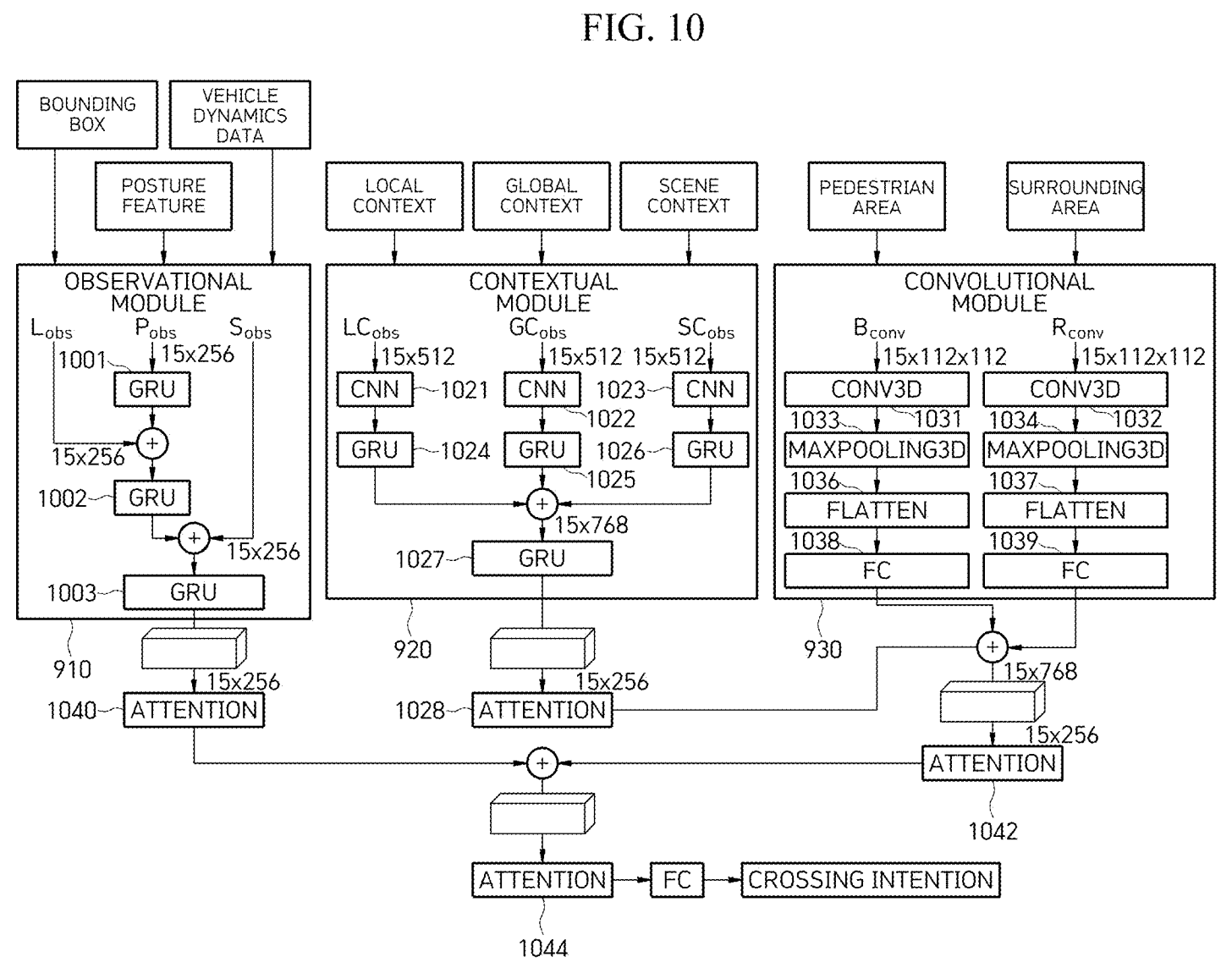

FIG. 9 is a diagram explaining each processing module for implementing a method for generating pedestrian behavior prediction data according to an embodiment of the present disclosure. FIG. 10 is a diagram explaining a detailed operation of each processing module for performing a method for generating pedestrian behavior prediction data according to an embodiment of the present disclosure.

Firstly, referring to FIG. 9, according to an embodiment of the present disclosure, m-th video frame before the current time t is set as an observation target (S810). That is, the video frames from the (t–m)-th frame to the t-th frame is set as the observation target video.

Secondly, multiple visual input feature data and non-visual input feature data are extracted from the observation target video (S820), and the input feature data is grouped to fit its attribute (S830).

Then, the grouped feature data is provided as input to a processing module 900. In this case, in an embodiment of the present disclosure, the processing module may include an observational module 910, a contextual module 920, and a convolutional module 930.

Accordingly, the non-visual features are taken and processed by the observational module 910. Then, the visual features including the context features are inputted into and processed by the contextual module 920 composed of Convolutional Neural Network (CNN) and Recurrent Neural Network (RNN), and are then processed by the convolutional module 930 composed of a 3D convolutional network, 3D max pooling, and flatten layer, and a fully connected (FC) layer.

Thereafter, the pedestrian behavior prediction data after the n-th frame may be generated by concatenation of the output results of the three processing modules (S840).

Referring to FIG. 10, according to an embodiment of the present disclosure, the visual input feature data and the non-visual input feature data are processed separately depending on their characteristics.

In an embodiment of the present disclosure, the visual input feature data may include local context feature that is an image having a predetermined multiple size of the bounding box data, global context feature including video segmentation data, scene context feature including entire video data, a pedestrian area obtained from the video input, and pedestrian-surrounding area in the video input from which the pedestrian area is removed.

In an embodiment, the non-visual input feature data may comprise pedestrian posture feature data, pedestrian bounding box data, and vehicle dynamics data including vehicle speed, direction, steering angle, angular velocity and so on.

As described above, the visual input feature data and the non-visual input feature data are grouped and inputted into respective processing modules 900.

For this, in an embodiment of the present disclosure, the pedestrian posture feature data, the pedestrian bounding box data, and the vehicle dynamics data may be generated as first feature data group. Further, the local context feature that is the image of the predetermined size around pedestrian bounding box, the global context feature including the video segmentation data, and the scene context feature including the entire video data may be used in generating second feature data group. Further, the pedestrian area obtained from the video input and the pedestrian-surrounding area from which the pedestrian area is removed from the video input may be used in generating third feature data group.

After the grouping of feature data, the first feature data group is inputted into the observational module 910, the second feature data group is inputted into the contextual module 920, and the third feature data group is inputted into the convolutional module 930.

Firstly, the first feature data group processed by the observational module 910 corresponds to the non-visual input feature data. The pedestrian posture feature data, the pedestrian bounding box data, and the vehicle dynamics data are inputted into the observational module 910.

The pedestrian posture feature data may be defined as in Equation 1 below.

$$P_{obs} = \{p_i^{t-m}, p_i^{t-m+1}, \dots , p_i^t\} \qquad \text{[Equation 1]}$$

In Equation 1, "m" means the observation length. For example, as the pedestrian posture feature data, human posture feature data may be extracted from plurality of coordinates, for example, 18, main key points (mouth, neck, shoulder, elbow, wrist, hip, knee, ankle, eye, ear, etc.) but the invention is not limited thereto. In the present embodiment, the 18 key points are expressed as 3D vectors, and each of the key points is composed of 2D coordinates in each time step.

The above-described pedestrian posture feature data is inputted into the first gate recurrent unit (GRU) module 1001, and feature encoding of the pedestrian posture feature data is obtained from the first GRU module 1001. GRU (gate recurrent unit) module is a type of RNN (recurrent neural network) module. In the present disclosure, GRU is used to process feature data, but other RNN (recurrent neural network) techniques (e. g. LSTM) or CNN (convolutional neural network) may be applied to process feature data.

Next, the pedestrian bounding box may be defined as in Equation 2 below.

$$L_{obs} = \{l_i^{t-m}, l_i^{t-m+1}, \dots , l_i^t\} \qquad \text{[Equation 2]}$$

In Equation 2, $l_i=[x_1, y_1, x_2, y_2] \in \mathbb{R}^4$ may be determined by the upper left coordinates ($[(x_1, y_1)]$) and the bottom left coordinates ($[(x_2, y_2)]$) of each pedestrian. Since the bounding box data is composed of four coordinates, the dimensions of $L_{obs}$ become m×4.

The pedestrian bounding box data may be concatenated with the feature encoding of the pedestrian posture feature data, and may be inputted into the second GRU module 1002, and may obtain the feature encoding of the pedestrian posture feature data included in the bounding box information from the second GRU module 1002.

Next, the vehicle speed information may be defined as in Equation 3 below.

$$S_{obs} = \{s_i^{t-m}, s_i^{t-m+1}, \dots , s_i^t\} \qquad \text{[Equation 3]}$$

In Equation 3, $s_i$ means an ego-vehicle speed, and this input feature passes through a process of obtaining data through the installation of a sensor in the vehicle.

The vehicle dynamics data may be concatenated with the pedestrian posture feature data included in the bounding box data and may be inputted into the third GRU module 1003, and may obtain feature encoding of the posture feature data corresponding to the pedestrian, vehicle dynamics data included in the bounding box information from the third GRU module 1003.

Next, the second feature data group processed by the contextual module 920 is composed of three kinds of image inputs, that is, local context feature, global context feature, and scene context feature. Through the respective context inputs, image features are extracted by using VGG19 network pre-trained in ImageNet as backbones of the CNN. The features output from the CNNs 1021-1023 are processed by using the first to third GRU modules 1024-1026, and the outputs of the first to third GRU modules are concatenated, and then fused into one output. After the fused output is inputted into the fourth GRU module 1027, the attention mechanism 1028 is applied to the output of the fourth GRU module.

First, the local context feature may be defined as in Equation 4 below.

$$LC_{tex} = \{lc_i^{t-m}, lc_i^{t-m+1}, \dots , lc_i^t\} \qquad \text{[Equation 4]}$$

The image around the pedestrian, including the crosswalk, traffic lights, and traffic signs, is an essential in predicting the pedestrian behavior. Accordingly, $lc_i$ is an image corresponding to an area around the pedestrian bounding box with predetermined size (e.g. 1.5 times larger than the pedestrian bounding box), and an RGB image is resized into 224×224 pixels. The feature vector is extracted as vector of size (m, 512), and is reduced to vector (m, 256) by a process through the max pooling layer of 14×14 kernels.

The input of the global context feature is defined as in Equation 5 below.

$$GC_{tex} = \{ gc_i^{t-m}, gc_i^{t-m+1}, \ldots, gc_i^t \} \qquad \text{[Equation 5]}$$

In Equation 5, $gc_i$ is obtained by extracting the semantic segmentation result by using DeepLabV3 model pre-trained in Cityscapes dataset. It is possible to classify the full scene and road surface by utilizing the semantic map value, and in a similar manner to the local context feature, the features are extracted and concatenated into the vector (m, 256).

The input of the scene context feature may be defined as in Equation 6 below.

$$SC_{tex} = \{ sc_i^{t-m}, sc_i^{t-m+1}, \ldots, sc_i^t \} \qquad \text{[Equation 6]}$$

Here, $sc_i$ means the full image as well as the pedestrian and its surrounding area. In the same manner as other contextual features, the full image is resized to 224×224 pixels, is processed by a max-pooling layer with 14×14 kernel, and is fused with other contextual features.

Lastly, the convolutional module 930 receives the pedestrian area (local box) and the surrounding area (local surround) from which the pedestrian area is removed from the video input, and the two kinds of feature data are inputted to the 3D convolutional networks (C3D) 1031, 1032. Further, the output feature data of the 3D convolutional network is sequentially reduced in a manner of 112→56→ . . . →4 using the max pooling layers 1033, 1034. The dimension-reduced images are converted into 1D images by the flatten layers 1036, 1037, and then are passed to the fully connected layer 1038, 1039, so that output feature data of convolutional module is generated by concatenating outputs of the fully connected layers 1038, 1039.

The pedestrian area may be defined as in Equation 7 below.

$$B_{conv} = \{ b_i^{t-m}, b_i^{t-m+1}, \ldots, b_i^t \} \qquad \text{[Equation 7]}$$

In Equation 7, $b_i$ denotes an image feature generated by cropping and padding the image feature with the same size as the size of the bounding box, and then adjusting longest dimension of the area of the croppped image to fit a desired output size. Thereafter, the last output of the feature data are passed to 3D convolution layer 1031 followed by max pooling layers 1033, and then flattend by flatten layer 1036 with its size adjusted to be able to be fused with other feature data.

The surrounding area from which the pedestrian area is removed may be defined as in Equation 8 below.

$$R_{conv} = \{ r_i^{t-m}, r_i^{t-m+1}, \ldots, r_i^t \} \qquad \text{[Equation 8]}$$

In Equation 8, $r_i$ means an image that cropped with a predetermined size (e.g., an area 1.5 times larger that the bounding box) around the bounding box like the local context feature, but of which the area corresponding to the bounding box is grayed out in order to utilize only the visual features from area surrounding the bounding box. This enables visual information around the pedestrian area to be utilized, and the 3D convolution acts in the same manner as the case of the local context feature data, so that future output values are concatenated.

Thereafter, according to one embodiment of the present disclosure, the output of the first processing module 910 for processing first feature data group is inputted into a first attention module 1040, and the output of the second processing module 920 for processing the second feature data group is inputted into a second attention module 1028. Further, the output result of the second attention module is concatenated with third feature data group and then is inputted into a third attention module 1042. Thereafter, the output of the first to third attention modules are concatenated, and then are passed to the fourth attention module 1044, so that the pedestrian behavior prediction data can be computed.

Meanwhile, in an embodiment of the present disclosure, in order to consider the temporal context of the input features, the gate recurrent unit (GRU) module, which is known to have simpler and efficient structure than the structure of the Long Short Term Memory (LSTM), is used. As the recurrent behavior for the GRU equation, variables at the $j^{th}$ level of the stack are defined as in Equation 9 below.

$$z_j^t = \sigma \left( x_j^t W_j^{xz} + h_j^{t-1} W_j^{hz} + b_j^z \right) \qquad \text{[Equation 9]}$$
$$r_j^t = \sigma \left( x_j^t W_j^{xr} + h_j^{t-1} W_j^{hr} + b_j^r \right)$$
$$\tilde{h}_j^t = \tanh \left( x_j^t W_j^x + \left( r_j^t \odot h_j^{t-1} \right) W_j^h + b \right)$$
$$h_j^t = \left( 1 - z_j^t \right) \odot h_j^{t-1} + z_j^t \odot \tilde{h}_j^t$$

Here, $\sigma(\bullet)$ is logistic sigmoid function, and $$x_j^t$$

means the input feature at time step t. W is the weight between two units, and $$r_j^t$$

and $$z_j^t$$

correspond to a reset gate and an update gate at time step t.

$$h_j^{t-1}$$

and $$h_j^t$$

mean the hidden states at the past time step and the current time step, respectively.

Next, since the attention mechanism is adopted to extract feature from a specific part of the video input, it is more suitable for extracting visual feature data related to a certain pedestrian bounding box. The output vector of the attention module may be defined as in Equation 10 below.

$$\beta_{attention} = \tanh\left(W_c[h_c:h_m]\right) \qquad \text{[Equation 10]}$$

$$h_c = \Sigma_{s^t} \alpha_t h_{s^t}$$

Here, $W_c$ is a weight matrix, m means an observation time, $h_m$ means the last hidden state of an encoder, and $h_c$ is a sum of all hidden states having received the attention weights.

$$h_s^t$$

is the previous hidden state of an encoder, and $\alpha_t$ is an attention weight vector. In this case, the attention weight vector may be defined as in Equation 11 below.

$$\alpha_t = \frac{\exp\left(\text{score}\left(h_m, \tilde{h}_s\right)\right)}{\Sigma_{s^t=1}^{T} \exp\left(\text{score}\left(h_m, \tilde{h}_{s^t}\right)\right)} \qquad \text{[Equation 11]}$$

Here, $$\text{score}(h_m, h_{s^t}) = h_m^T W_p h_s$$

is a content-based function, and $W_p$ means a learnable weight matrix.

Further, according to an embodiment of the present disclosure, the pedestrian behavior, that is, whether the pedestrian is crossing, can be automatically labeled with respect to the entire frame of the video input based on the pedestrian risk assessment unit 230. That is, according to an embodiment of the present disclosure, an automatic labeling method may be applied to the dataset for enhancement and extension of the dataset.

The pedestrian crossing annotation included in the existing dataset is not labeled with respect to all frames, and thus there are limitations in that training of the pedestrian behavior prediction can be performed only with respect to the section with annotation. That is, the prediction accuracy may be improved if additional training samples are available.

In order to obtain additional training samples, according to an embodiment of the present disclosure, an auto labelling method capable of generating training samples for pedestrian behavior prediction is applied. That is, whether the pedestrian is on the sidewalk or in the roadway in the video is classified by using the pedestrian risk assessment unit 230. If the pedestrian is on the sidewalk, the pedestrian is labelled as a safe pedestrian, whereas if the pedestrian is in the roadway, the pedestrian is labelled as an unsafe pedestrian.

Such labels may be added to the training samples so as to be utilized in the learning process of the pedestrian behavior prediction.

Through this, according to an embodiment of the present disclosure, fast labeling can be performed with respect to a large amount of behavior prediction data in the video. Further, since the labeling is performed based on the sidewalk and the roadway instead of subjective decision mad by human, labeling consistency can be maintained. Further, since the fast labeling can be performed even with respect to a new video, it is very easy to improve the performance of the pedestrian behavior prediction.

Next, the potential risk of a pedestrian is assessed based on the trajectory prediction data, behavior prediction data, and ground classification result corresponding to the video input (S430). Hereinafter, referring to FIGS. 11 to 19, a process of assessing the pedestrian potential risk according to an embodiment of the present disclosure will be described.

Figure 11:
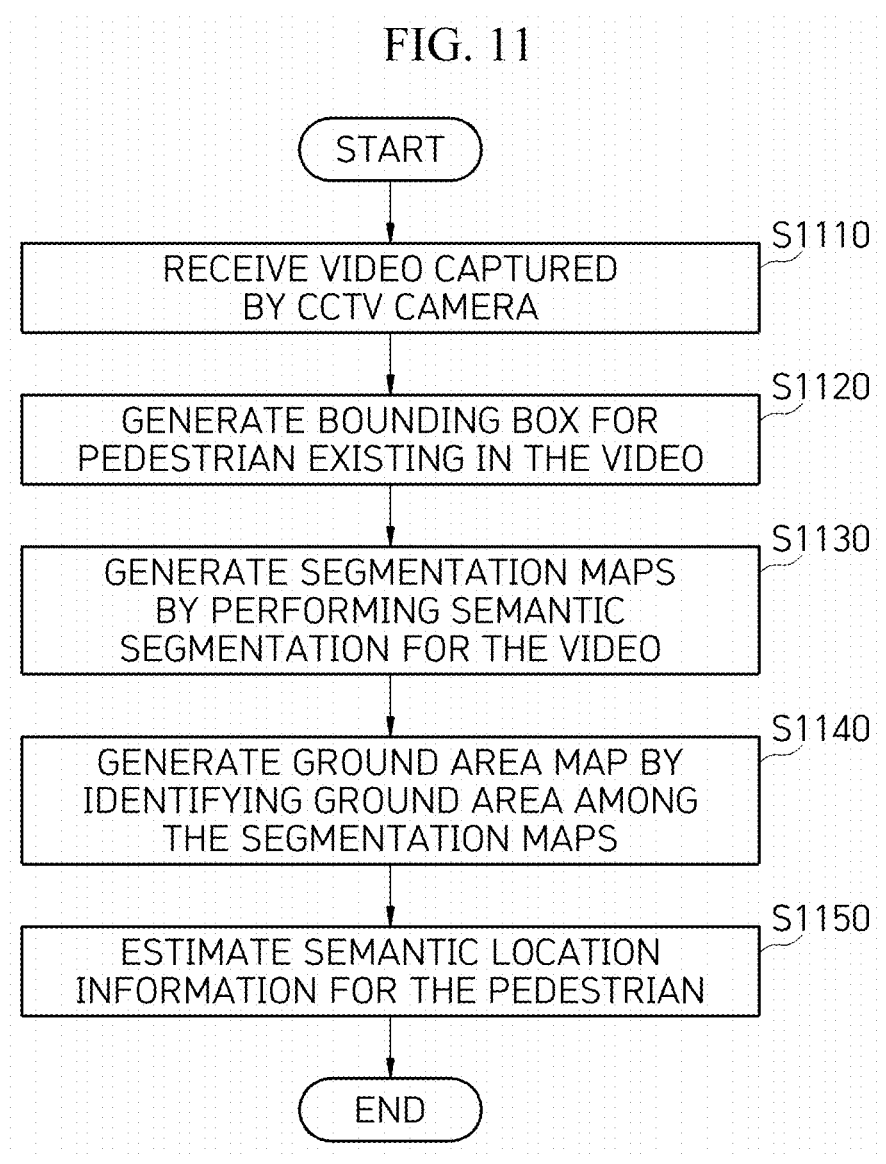
FIG. 11 is a flowchart illustrating a method for pedestrian risk assessment according to an embodiment of the present disclosure.

FIG. 11 is a flowchart illustrating a method for pedestrian risk assessment according to the first embodiment of the present disclosure.

A method for pedestrian risk assessment according to an embodiment of the present disclosure includes: receiving a video captured by a CCTV camera installed in a predetermined location (S1110); generating a bounding box for a pedestrian existing in the video (S1120); generating segmentation maps by performing semantic segmentation for the video (S1130); generating a ground area map by identifying a ground area using the segmentation maps (S1140); and estimating semantic location information the pedestrian based on the bounding box and the ground area map (S1150).

First, video inputs are obtained by the CCTV camera installed in a predetermined location through which the pedestrian passes, such as a crosswalk or children's protection zone (S1110). Of course, a video frame being streamed in real time or a pre-stored video file may be used.

Next, the bounding box for the pedestrian existing in the video is generated (S1120). In this case, a certain technique may be applied to the method for generating the bounding box in the video of the people existing in the scenes. For example, deep learning-based object detection modules (You Only Look Once (YoLO), Single Shot MultiBox Detector (SSD)), Hough Transform, and Contour-based detection techniques can be applied.

Next, the segmentation maps are generated by semantic segmentation for the video (S1130). For reference, semantic segmentation is the process of classifying which object category each pixel in the video frame belongs to. In this case, the segmentation map may be expressed as a probability map for each of c classes. In the step S1130, the semantic segmentation including areas related to road surfaces, such as the road, crosswalk, and sidewalk, is performed with respect to the target object.

Next, the ground area map is generated by identifying the ground area using the segmentation maps (S1140). In the step S1140, the area related to the ground surface is automatically identified by using the given segmentation maps.

Figure 12:
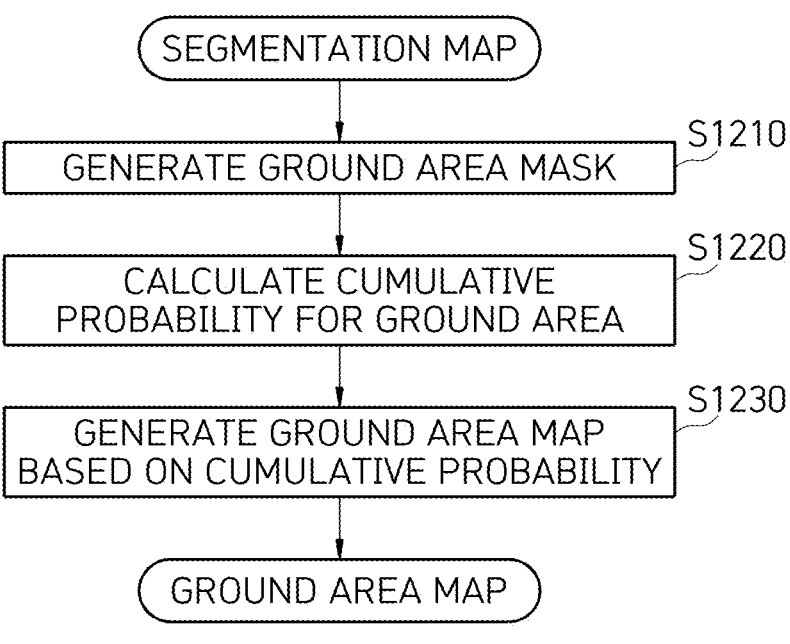
FIG. 12 is a diagram explaining a process of generating a ground area map according to an embodiment of the present disclosure.
Figure 13:
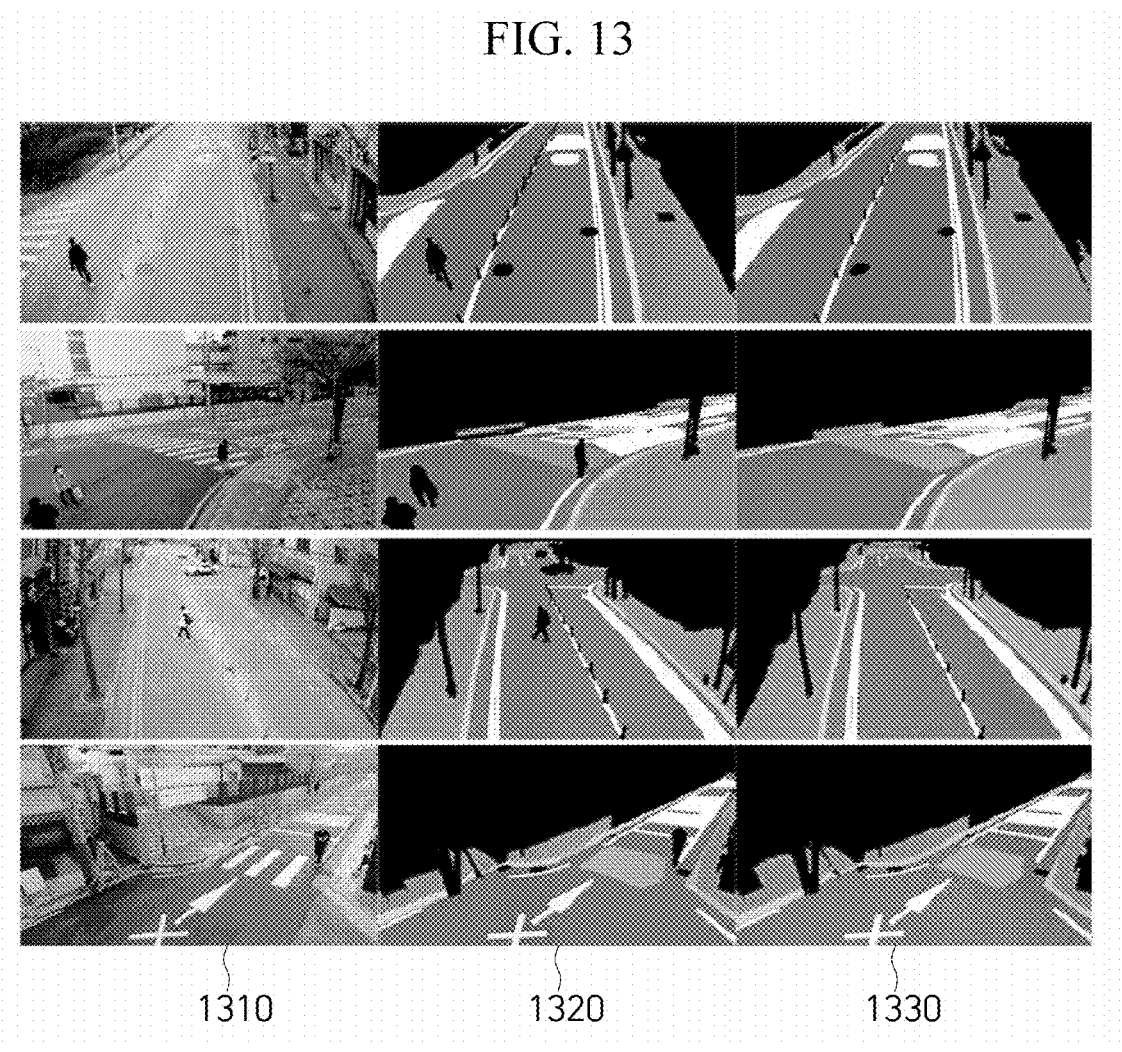
FIG. 13 is a diagram illustrating an example of a ground area map estimated according to an embodiment of the present disclosure.

FIG. 12 is a diagram explaining a process of generating the ground area map according to an embodiment of the present disclosure. FIG. 13 is a diagram illustrating an example of the ground area map according to an embodiment of the present disclosure.

Generally, in single frame, road surface observed by a camera is covered by various objects such as persons and vehicles, it is difficult to accurately classify the ground area for identification of the semantic location of the pedestrian. Accordingly, in an embodiment of the present disclosure, in order to solve such a problem, the ground area can be extracted with the object area information excluded by accumulating the video segmentation result through utilization of the feature that in case of a fixedly installed CCTV camera, there is little change in the ground area over time.

According to an embodiment, in order to generate the ground area map, a ground area mask, in which the pixel belonging to the ground area is set to true, is generated to temporally accumulate the probability of the interested class (ground area) (S1210). In this case, the ground area mask may be defined as in Equation 12 below.

$$M_i(x) = \begin{cases} 1, & argmas_c P_{c,i}(x) \in c_{ground}, \\ 0, & otherwise \end{cases} \quad \text{[Equation 12]}$$

In the above equation, x represents pixel coordinates, $P_{c,i}$ is a segmentation map representing the probability of the class c in the i-th frame, and C_ground is a class set for the interested ground area (roadway, crosswalk, and sidewalk).

Next, by combining the ground area mask and the segmentation map, the cumulative probability for the ground area over time is calculated through Equation 13 below (S1220).

$$A_{c,i}(x) = A_{c,i-1}(x) + P_{c,i-1}(x) \circ M_{i-1}(x) \quad \text{[Equation 13]}$$

In Equation 13, $\circ$ is element-wise multiplication operation.

Next, the ground area map representing what ground area each pixel belongs to is generated based on the cumulative probability (S1230).

In an embodiment of current disclosure, a process for normalizing the cumulative probability may be additionally performed, and for the normalization, the number of pixels for which the probability up to the i-th frame is accumulated for each pixel is calculated through Equation 14 below.

$$N_i(x) = N_{i-1}(x) + M_{i-1}(x) \quad \text{[Equation 14]}$$

Further, the ground area map representing what ground area each pixel belongs to may be calculated through Equation 15 below.

$$G_i(x) = \underset{c}{argmax} \frac{A_{c,i}(x)}{N_i(x)} \quad \text{[Equation 15]}$$

An example of the ground area map estimated through the process above is illustrated in FIG. 13, and through this, the ground area can be identified even it is temporarily covered by moving objects from the video segmentation result. In this case, in FIG. 13, the left column represents the input video (1310), the column in the middle represents the video segmentation result (1320), and the right column represents the road area estimation result (1330).

Referring again to FIG. 11, the semantic location information for the pedestrian is then estimated based on the bounding box and the ground area map (S1150).

Figure 14:
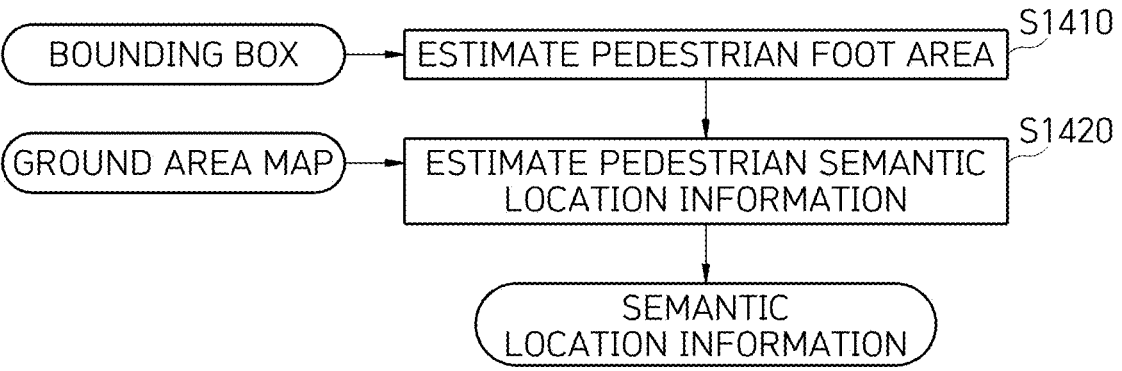
FIG. 14 is a diagram explaining a process of estimating pedestrian semantic location data according to an embodiment of the present disclosure.
Figure 15:
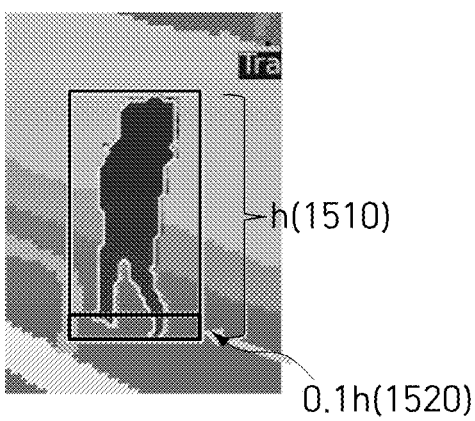
FIG. 15 is a diagram explaining a process of estimating a pedestrian foot area.
Figure 16:
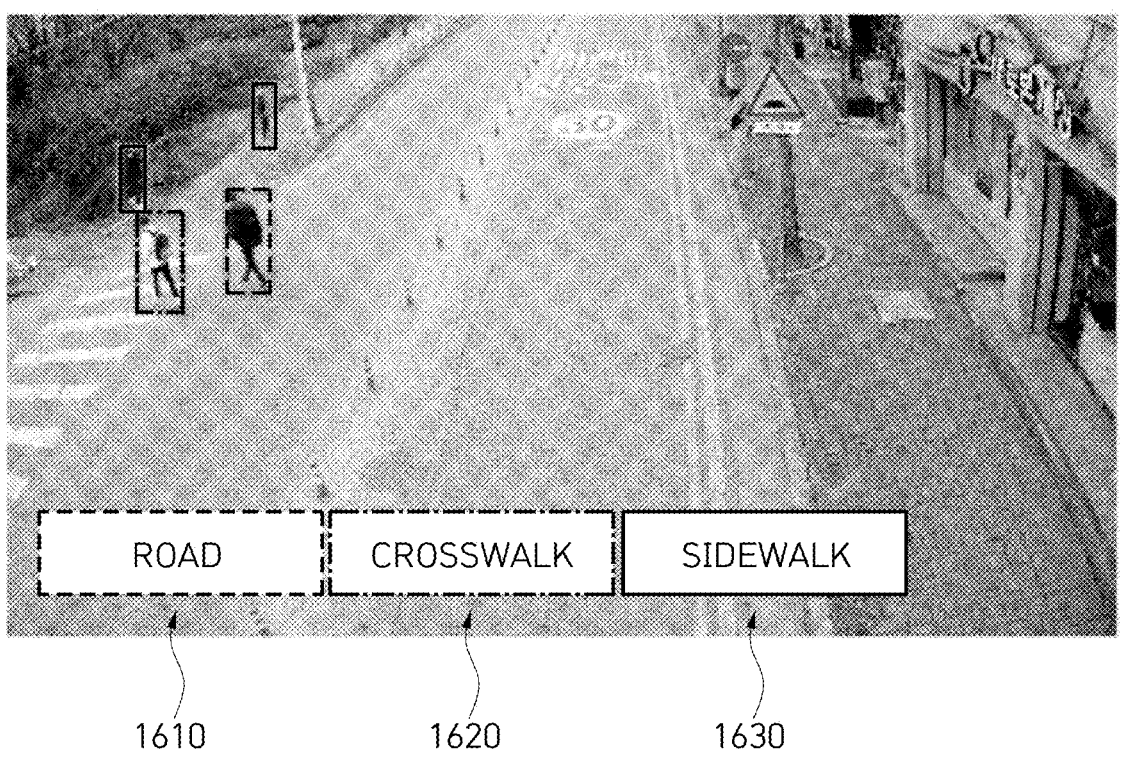
FIG. 16 is a diagram illustrating an example of the result of estimating pedestrian semantic location data according to an embodiment of the present disclosure.

FIG. 14 is a diagram explaining a process of estimating pedestrian semantic location information according to an embodiment of the present disclosure. FIG. 15 is a diagram explaining the process of estimating a pedestrian foot area. FIG. 16 is a diagram illustrating an example of the result of estimating pedestrian semantic location information according to an embodiment of the present disclosure.

First, in order to identify in what ground area the pedestrian actually stands, the pedestrian's feet area is estimated from the bounding box (S1410). In the present disclosure, the bottom area 1520 having a predetermined ratio may be estimated as the pedestrian's feet area from the size information 1510 of the bounding box as in FIG. 15. In this case, the predetermined ratio may be set to be 10% but the invention is not limited thereto.

Next, a class corresponding to the most pixels on the ground area map that contacts the pedestrian's foot area may be classified as the semantic location information of the pedestrian (S1420).

Referring to FIG. 16, the semantic location information of the pedestrian may be separated and discriminated into a road 1610, a crosswalk 1620, and a sidewalk 1630, and may be separately expressed through colors and texts discriminated from each other.

Figure 17:
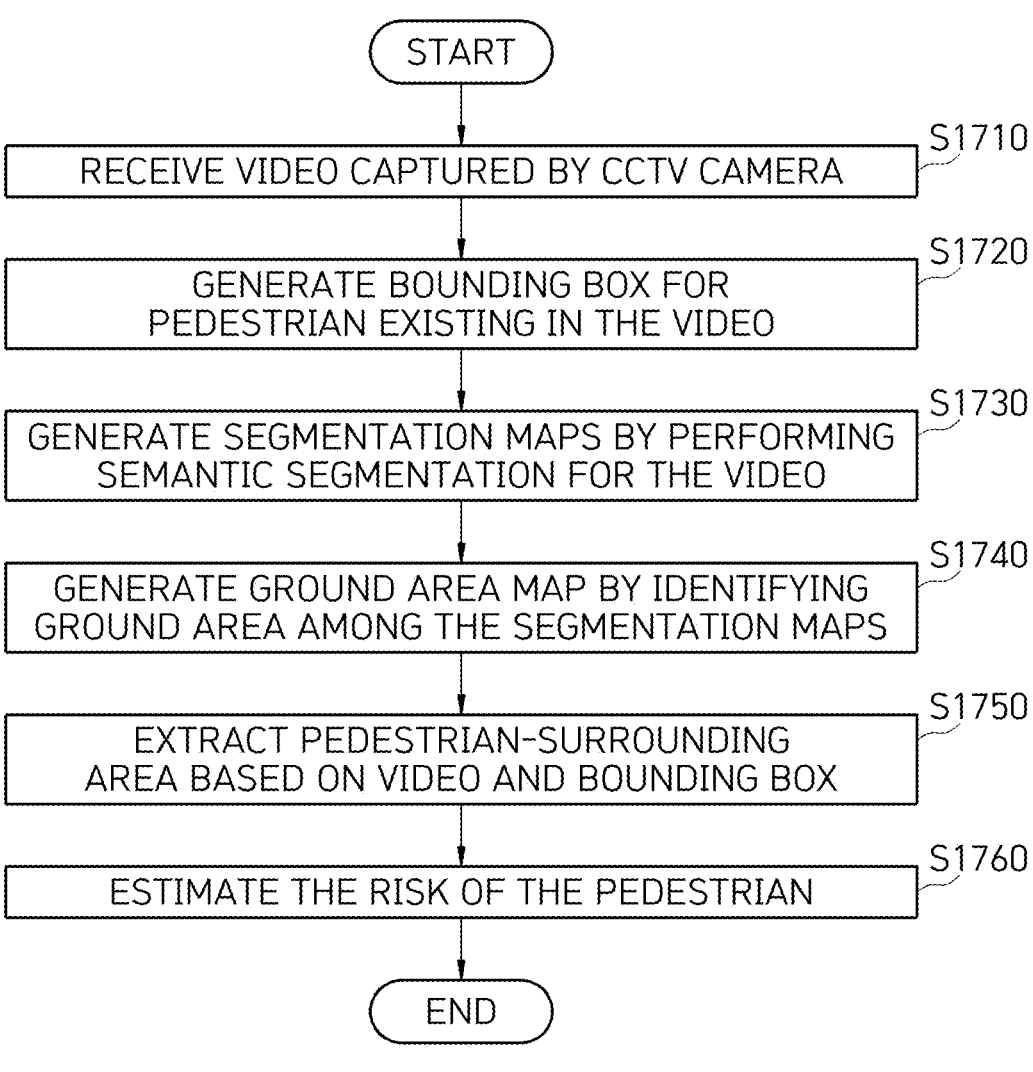
FIG. 17 is a flowchart illustrating a method for pedestrian risk assessment according to an embodiment of the present disclosure.

FIG. 17 is a flowchart illustrating a method for pedestrian risk assessment according to a second embodiment of the present disclosure. In this case, another embodiment of the present disclosure includes technical features partially common to those of the first embodiment, and thus duplicate contents will be omitted if possible.

Meanwhile, although the first embodiment of the present disclosure is to estimate the semantic location information of the pedestrian, and the second embodiment of the present disclosure is to assess pedestrian risk, they may not be separately performed, but may be additionally applied to the mutual embodiments. This means that the pedestrian risk asseement may be additionally performed after the semantic location estimation of the pedestrian is estimated in the first embodiment.

First, if the video captured through the CCTV camera installed in the predetermined location is inputted (S1710), and the bounding box for the pedestrian existing in the video is generated S1720).

Next, segmentation maps are generated by performing the semantic segmentation for the video input (S1730), and the ground area map is generated through identification of the ground area using the segmentation maps (S1740).

Next, the pedestrian-surrounding area and the bounding box area in the video input are extracted from video (S1750). Further, the pedestrian risk is assessed based on the surrounding area in the video and the ground area map (S1760).

Figure 18A:
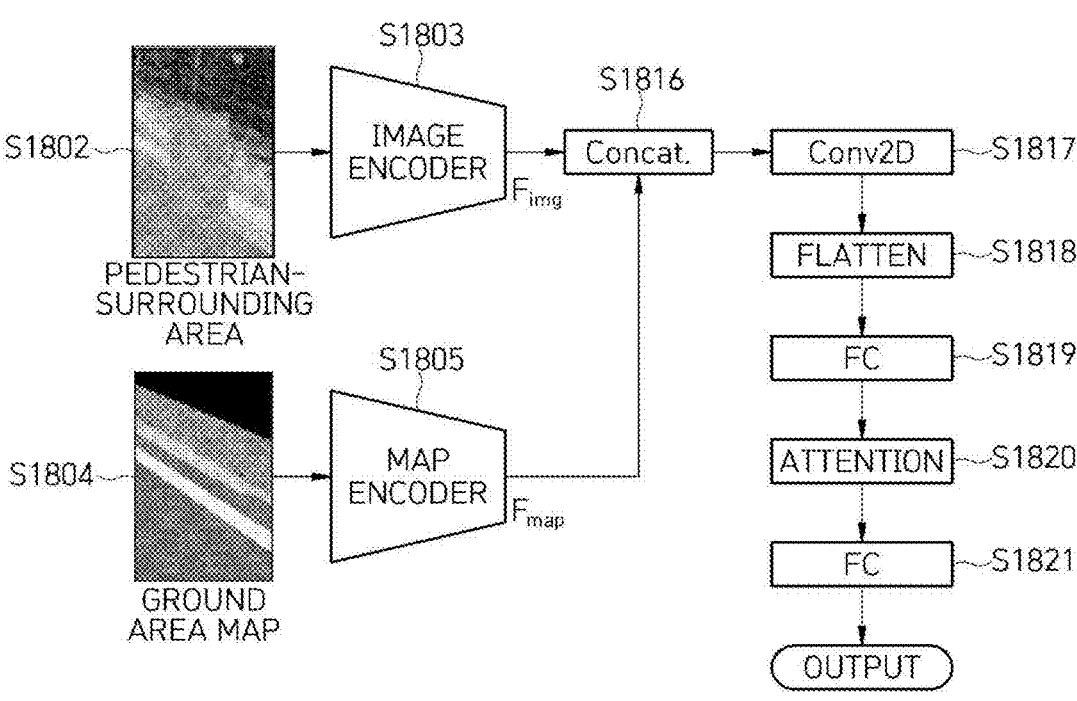
FIG. 18A is a diagram explaining a process of estimating a pedestrian risk according to an embodiment of the present disclosure.
Figure 18B:
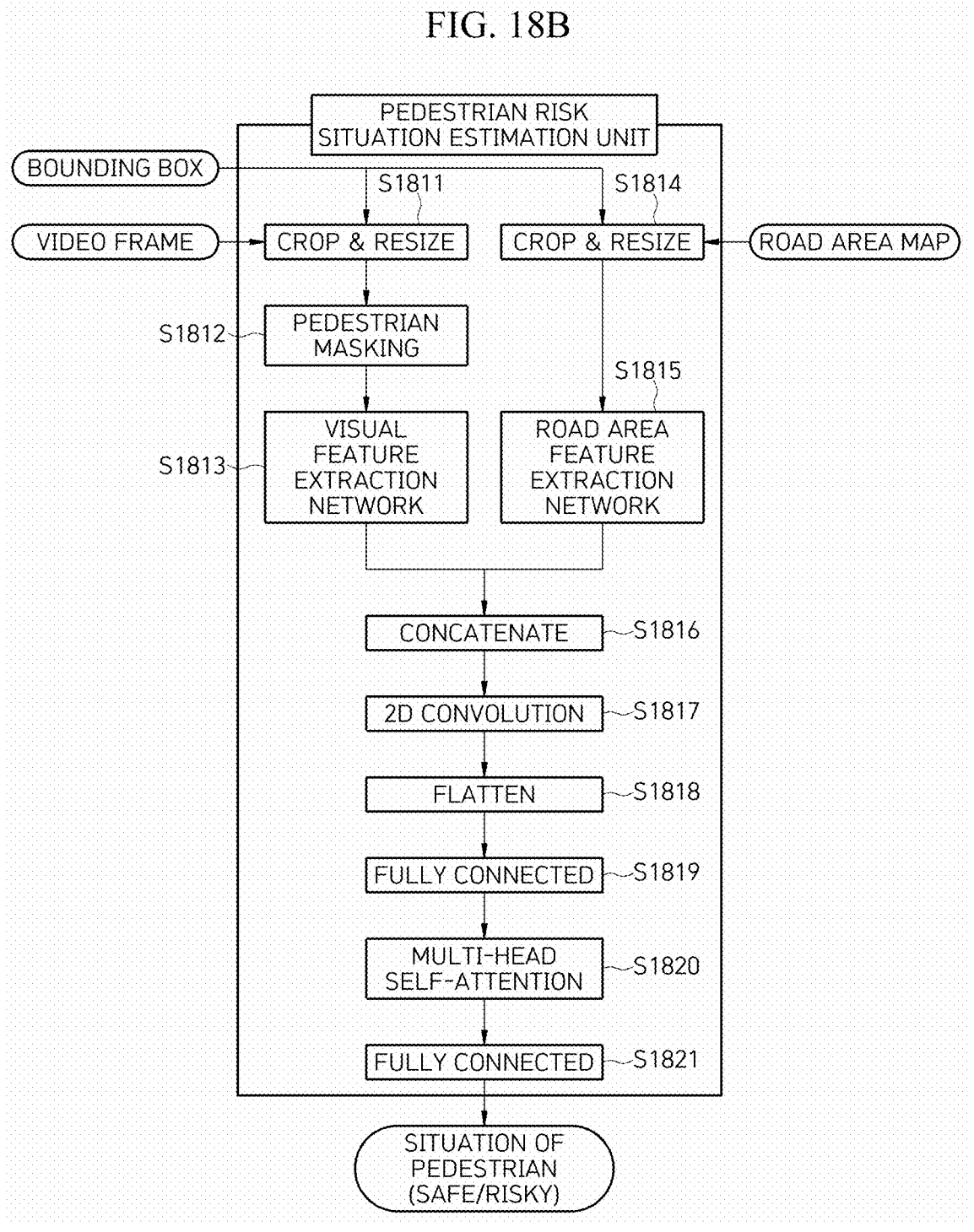
FIG. 18B is a diagram explaining an estimation network that estimates a pedestrian risk according to an embodiment of the present disclosure.

FIG. 18A is a diagram explaining the process of estimating a pedestrian risk according to an embodiment of the present disclosure. FIG. 18B is a diagram explaining an estimation network that assessing pedestrian risk according to an embodiment of the present disclosure.

In the present disclosure, the pedestrian-surrounding area in the video (S1802) is extracted from the video frame, and it is estimated whether the pedestrian is in a potentially risky location (road or crosswalk) or in a safe area (sidewalk) by utilizing the ground area map (S1804) obtained in the previous step. In this process, according to an embodiment of the present disclosure, an estimation network illustrated in FIG. 18B is devised to effectively fuse the video frame and the ground area map.

First, according to an embodiment of the present disclosure, the first feature map including a visual feature of pedestrian surroundings may be extracted by inputting the video frame and the bounding box to an image encoder (S1803).

Specifically, in order to extract the pedestrian-surrounding area from the video input, cropped video is generated by cropping areas of predetermined size (e.g. twice larger area than the pedestrian bounding box) surrounding the pedestrian bounding box (S1811).

Next, the area corresponding to the bounding box is removed from the first cropped video. In case of FIG. 18B, the extraction of the pedestrian's visual information is excluded by filling the bounding box area of the original pedestrian with gray ('Pedestrian Masking', S1812).

Next, the first feature map including the visual feature for the pedestrian surroundings area is extracted by inputting the video from which the area corresponding to the bounding box is removed to a pre-trained visual feature extraction network (S1813). As an example, the first feature map $F_{img}$ is extracted from the output of the last convolutional layer of VGG19 by inputting the pedestrian surroundings image to the VGG19 pre-trained using ImageNet dataset. The first feature map includes the visual feature map of the pedestrian-surrounding area.

Further, according to an embodiment of the present disclosure, the second feature map including the ground feature for the pedestrian and the pedestrian surroundings may be extracted by inputting the video, the bounding box, and the ground area map to a map encoder (S1805).

Specifically, a second cropped video is generated by converting the ground area map into the RGB video and then cropping the same area as the area of the first cropped video (S1814). The ground area map includes ground information for determining on what ground the pedestrian stands. In order to extract such information, the ground area map is converted into an image. Further, the converted image is cropped in accordance with the first video and resized to have size of 224×224 pixels.

Next, the second feature map including the ground feature for the pedestrian and the pedestrian surroundings is extracted by inputting the second cropped video to a pre-trained road area feature extraction network (S1815). In this process, according to an embodiment of the present disclosure, an atrous convolution is used to extract a wider spatial feature without down sampling as an example. For the ground area map, three 3×3 atrous convolutions each having 32, 64, and 128 filters and 2, 4, and 8 dilation rates are applied. Further, the second feature map $F_{map}$ is extracted by applying 32×32 max pooling to the output of the last layer. The second feature map comprises the ground feature data of the pedestrian and the surroundings.

Next, in order to fuse the features while maintaining 2D spatial information existing in the first and second feature maps, the first and second feature maps are concatenated in a channel direction (S1816), and the convolutional layer having the 3×3 kernel size and 512 filters (S1817).

Next, in order to convert the fused features into feature vectors, the flatten layer and the fully connected layer having 512 units are applied (S1818 and S1819).

Next, in order to perform learning to focus on the part that helps the classification in the generated feature vectors, 8 heads are provided, and each of the heads applies 32D multi-head self-attention (S1820).

Last, the pedestrian risk (risky situation probability) is constituted to become the last output by applying the fully connected layer having one unit (S1821).

Meanwhile, in the above description, depending on the implementation example of the present disclosure, the steps S1110 to S1821 may be further segmented into additional steps or may be combined into fewer steps. Further, if needed, some steps may be omitted, or the order between the steps may be changed. In addition, the contents of FIG. 1 and the contents of FIGS. 2 to 18 may be mutually applied.

Hereinafter, referring to FIGS. 19 to 24, effects of the system and method for predicting pedestrian safety information according to an embodiment of the present disclosure will be described in detail through the test results of the system and method.

Figure 19:
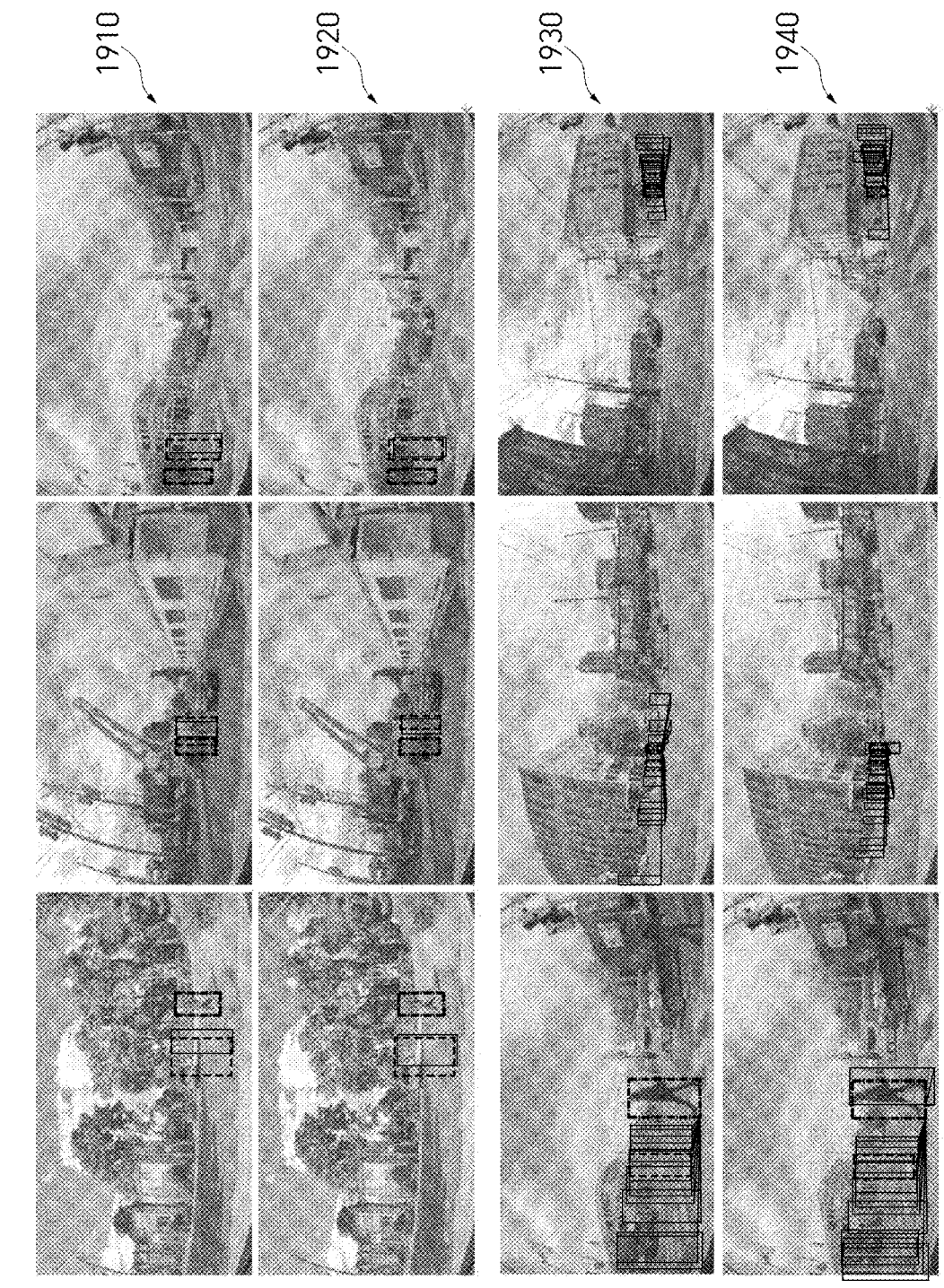
FIG. 19 is a diagram illustrating trajectory prediction data in a PIE dataset.
Figure 20:
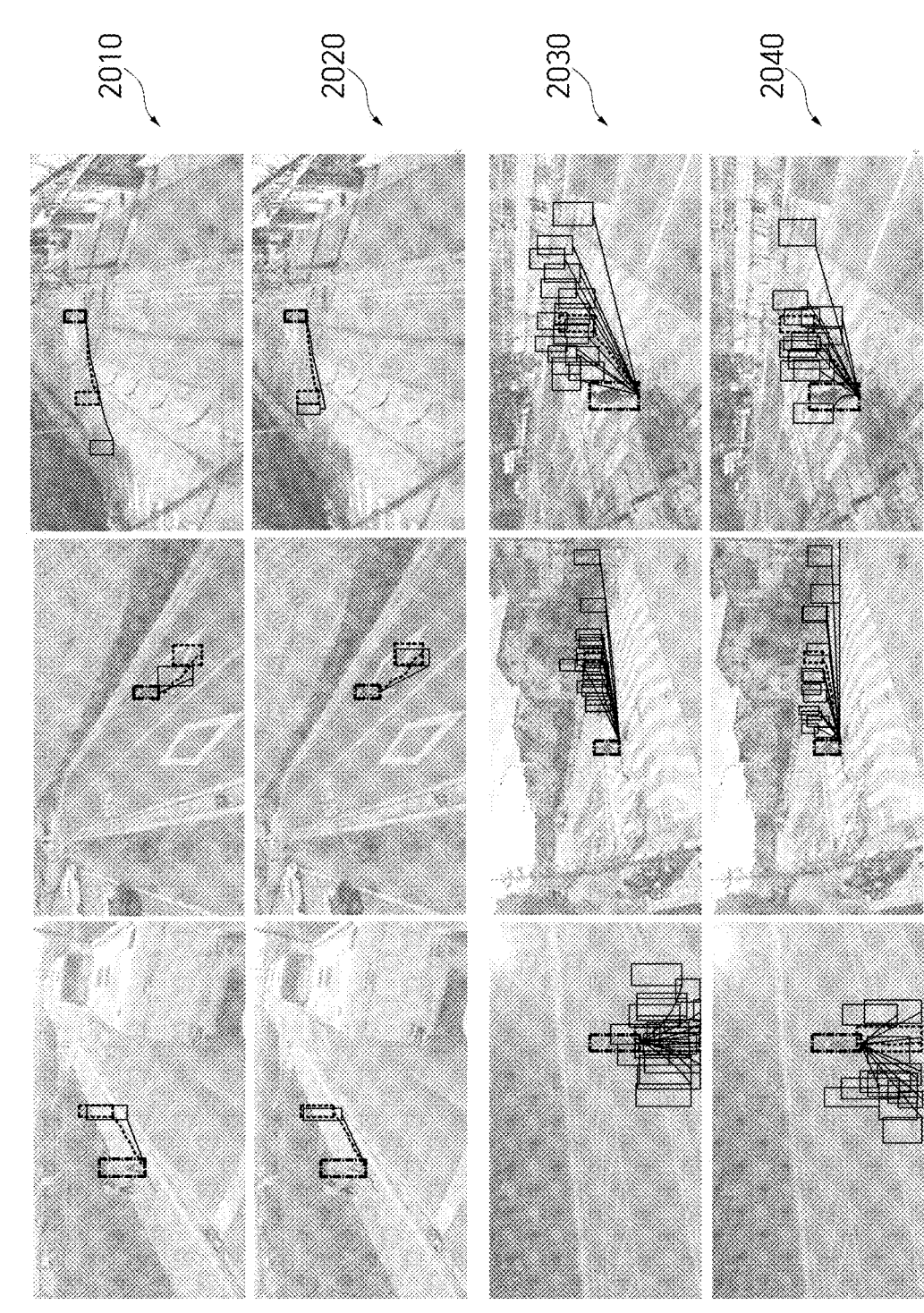
FIG. 20 is a diagram illustrating trajectory prediction data in a children's road walking risky behavior dataset in a children's protection zone according to an embodiment of the present disclosure.

FIG. 19 is a diagram illustrating a trajectory prediction data in a Pedestrian Intention Estimation (PIE) dataset. FIG. 20 is a diagram illustrating a trajectory prediction data in a children's road walking risky behavior dataset in a children's protection zone.

Quantitative comparison of pedestrian trajectory prediction performance of an embodiment of present disclosure is shown in Table 1 and Table 2. Joint Attention in Automonous Driving (JAAD) and PIE datasets, which are used in comparison shown in Table 1, are composed of videos taken by vehicle mounted cameras and corresponding annotation of pedestrian trajectories. On the other hand, National Information Society Agency (NIA) dataset (children's road walking risky behavior video in children's protection zone), used in comparative study in Table 2, contains videos obtained by fixed CCTV cameras in traffic scenes. In case of predicting a plurality of future trajectory candidates from the performance, they are separately represented by suffix "*". It can be identified that the trajectory prediction method proposed in the performance comparison for two tables shows an effectiveness of the embodiment in comparison to existing pedestrian trajectory prediction methods.

TABLE 1

| | JAAD | | | PIE | | |
|---|---|---|---|---|---|---|
| Method | ADE (0.5/1.0/1.5 s) | $C_{ADE}$ (1.5 s) | $C_{FDE}$ (1.5 s) | ADE (0.5/1.0/1.5 s) | $C_{ADE}$ (1.5 s) | $C_{FDE}$ (1.5 s) |
| Linear | 233/857/2303 | 1565 | 6111 | 123/477/1365 | 950 | 3983 |
| LSTM | 389/569/1558 | 1473 | 5766 | 172/330/911 | 837 | 3352 |
| B-LSTM | 159/539/1535 | 1447 | 5615 | 101/296/855 | 811 | 3259 |
| FOL-X | 147/484/1374 | 1290 | 4924 | 47/183/584 | 546 | 2303 |
| PIEtraj | 100/399/1280 | 1183 | 4780 | 58/200/636 | 596 | 4577 |
| PIEfull | — | — | — | —/—/566 | 520 | 2162 |
| BiTraP-D | 93/378/1206 | 1105 | 4565 | 41/161/511 | 481 | 1949 |
| * BiTraP-NP (20) | 38/94/222 | 177 | 565 | 23/48/102 | 81 | 261 |
| * BiTraP-GMM (20) | 153/250/585 | 501 | 998 | 38/90/209 | 171 | 368 |

TABLE 1-continued

| Method | JAAD | | | PIE | | |
|---|---|---|---|---|---|---|
| | ADE (0.5/1.0/1.5 s) | $C_{ADE}$ (1.5 s) | $C_{FDE}$ (1.5 s) | ADE (0.5/1.0/1.5 s) | $C_{ADE}$ (1.5 s) | $C_{FDE}$ (1.5 s) |
| Proposed-D | 79/333/1069 | 1024 | 4184 | 34/138/455 | 428 | 1831 |
| * Proposed-NP (20) | 32/80/180 | 141 | 398 | 15/37/87 | 63 | 191 |

TABLE 2

| Method | ADE (1.0/2.0/3.0 s) | $C_{ADE}$ (3.0 s) | $C_{FDE}$ (3.0 s) |
|---|---|---|---|
| BiTraP-D | 94/443/1144 | 1125 | 3398 |
| * BiTraP-NP (20) | 27/97/230 | 215 | 613 |
| Proposed-AVF-D | 85/392/1029 | 1011 | 3303 |
| * Proposed-AVF-NP (20) | 23/83/203 | 190 | 537 |

FIGS. 19 and 20 show the experimental results for qualitative comparison of the predicted trajectories according to an embodiment of the present disclosure. It was identified that the pedestrian trajectory prediction by the visual attention feature are more accurate, and even in case of the multi-trajectory prediction, more plausible pedestrian trajectory prediction results were derived.

In FIGS. 19 and 20, the first rows 1910 and 2010 represent single trajectory prediction data using BiTraP-D, and the second rows 1920 and 2020 represent a single trajectory prediction data using an embodiment of the present disclosure. Further, the third rows 1930 and 2030 represent the multi-trajectory prediction data in BiTraP-NP, and the fourth rows 1940 and 2040 represent the multi-trajectory prediction data in an embodiment of the present disclosure. In the respective drawings, a solid line indicates pedestrian trajectory prediction data, and a dotted line indicates true pedestrian trajectory.

Figure 21:
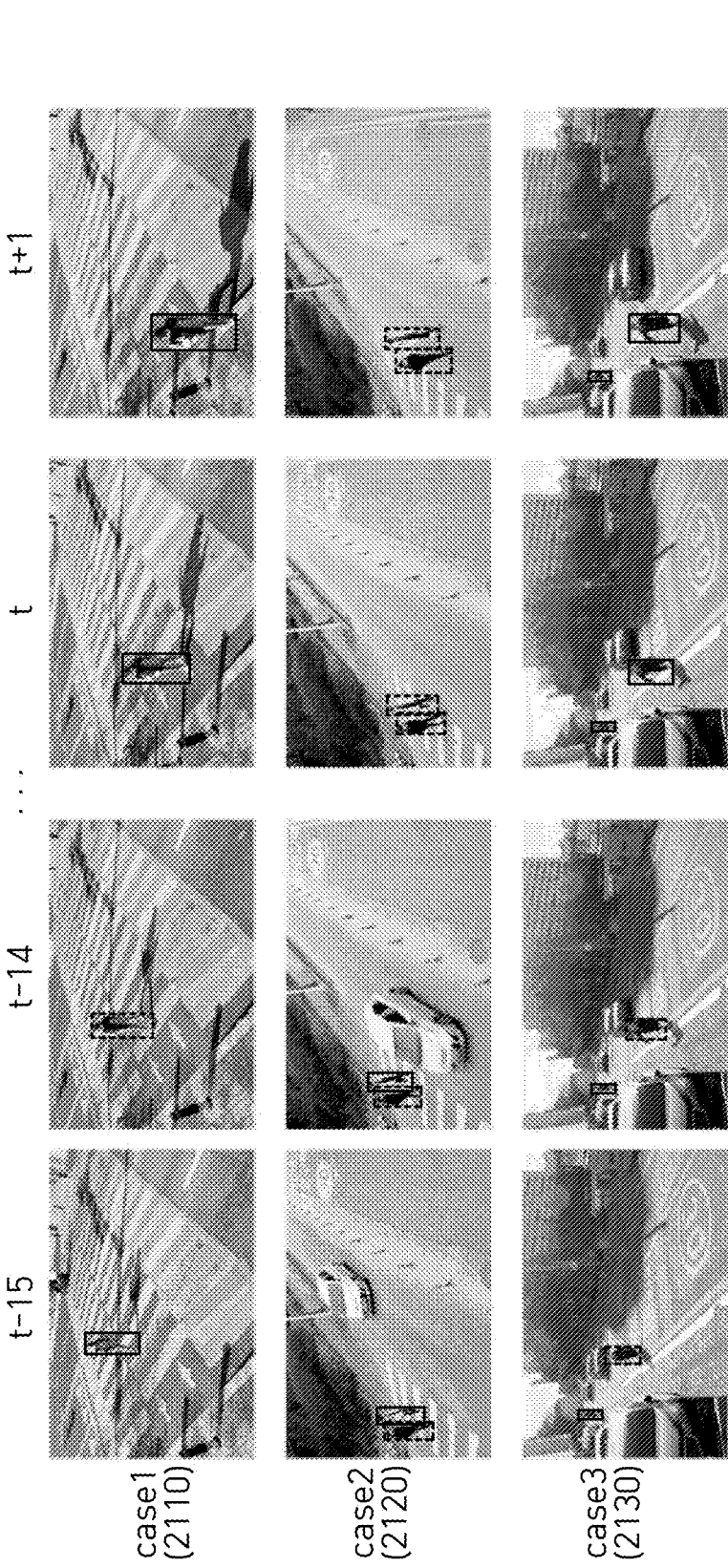
FIG. 21 is a diagram explaining a qualitative analysis result of pedestrian behavior prediction data according to an embodiment of the present disclosure.
Figure 22:
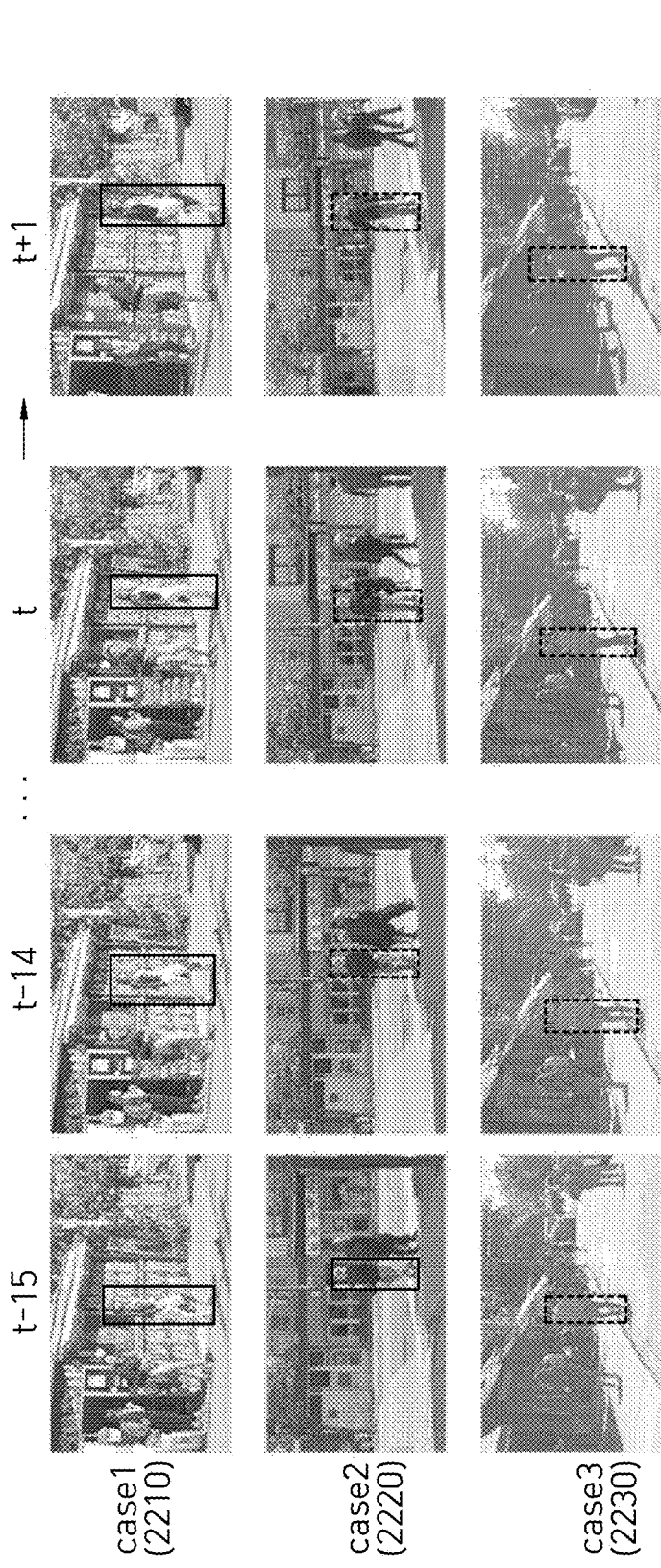
FIG. 22 is a diagram explaining another qualitative analysis result of pedestrian behavior prediction data according to an embodiment of the present disclosure.

FIG. 21 is a diagram explaining a qualitative analysis result of a pedestrian behavior prediction data according to an embodiment of the present disclosure. FIG. 22 is a diagram explaining another qualitative analysis result of a pedestrian behavior prediction data according to an embodiment of the present disclosure.

The pedestrian behavior prediction accuracy (ACC) is determined depending on the proportion of correctly predicted samples, and this follows Equation 16 below.

$$ACC = \frac{TP + TN}{TP + TN + FP + FN} \qquad \text{[Equation 16]}$$

In Equation 16, "TP" means true positive, "IN" means true negative, "FP" means false positive, and "EN" means false negative. "TP" represents a case that the model predicts that the pedestrian crosses the road and it actually happens, "IN" represents a case that the model predicts that the pedestrian does not cross the road and it actually happens, "FP" represents a case that the model predicts that the pedestrian crosses the road, but it does not actually happen, and "FN" represents a case that the model predicts that the pedestrian does not cross the road, but the pedestrian actually crosses the road.

The pedestrian behavior prediction performance comparison results through the system and the method proposed in an embodiment of the present disclosure will be described in the following. Representatively, in the PIE dataset that is the dataset being used for the pedestrian behavior prediction, the performance comparison results between benchmark models in the present disclosure and the existing different benchmark models are as shown in Table 3 below.

| Model | Visual Encoder | Features | ACC | AUC | F1 | Precision | Recall |
|---|---|---|---|---|---|---|---|
| SingleRNN | VGG + GRU | P, L, S, B, R | 0.76 | 0.64 | 0.45 | 0.63 | 0.36 |
| MultiRNN | VGG + GRU | P, L, S, B | 0.86 | 0.80 | 0.73 | 0.80 | 0.67 |
| SFRNN | VGG + GRU | P, L, S, B, R | 0.83 | 0.77 | 0.68 | 0.72 | 0.64 |
| PCPA | C3D + GRU | P, L, S, LC | 0.86 | 0.85 | 0.77 | 0.70 | 0.85 |
| | I3D + GRU | P, L, S, LC | 0.87 | 0.86 | 0.79 | 0.75 | 0.84 |
| | VGG + GRU | P, L, S, LC | 0.87 | 0.86 | 0.77 | 0.75 | 0.79 |
| MCIP | C3D + GRU | P, L, S, LC, GC | 0.86 | 0.86 | 0.78 | 0.72 | 0.85 |
| | I3D + GRU | P, L, S, LC, GC | 0.85 | 0.81 | 0.74 | 0.76 | 0.71 |
| | VGG + GRU | P, L, S, LC, GC | 0.89 | 0.87 | 0.81 | 0.81 | 0.81 |
| Ours | VGG + C3D + GRU | P, L, S, LC, GC, SC, B, R | 0.91 | 0.89 | 0.84 | 0.85 | 0.83 |

The comparison metrics employed in this comparison are accuracy (ACC), Area Under the Curve (AUC), and F1-score. The ACC is the prediction accuracy, and the AUC is a lower area of the receiver operation characteristics (ROC) curve, and is defined as in Equation 17 below.

$$AUC(f) = \Sigma_{t_0 \in D^0} \Sigma_{t_1 \in D^1} \frac{1[f(t_0) < f(t_1)]}{|D^0| \cdot |D^1|} \qquad \text{[Equation 17]}$$

Here, f is a predictor that returns the probability of crossing intention, and $1[f(t_0) < f(t_1)]$ means an indicator function that returns 1 in case of $f(t_0) < f(t_1)$, and returns 0 otherwise. $D^0$ is a negative sample set, and $D^1$ is a positive sample set. If the AUC is high, it means that models can be effectively distinguished between different classes.

The F1-score is a harmonic mean of precision and recall, and is defined as in Equation 18 below.

$$F1 = \frac{2 \times \text{precision} \times \text{recall}}{\text{precision} + \text{recall}} \qquad \text{[Equation 18]}$$

Further, in Table 1 above, P means pedestrian posture feature data, L means pedestrian bounding box information, and S means vehicle speed information. Further, LC means local context feature, GC means global context feature, SC means scene context feature, B means a pedestrian area, and R means the pedestrian-surrounding area from the video.

An embodiment of the present disclosure shows the biggest difference on the point that it uses both VGG and 3D Convolutional Network (C3D) as a visual encoder with respect to an image feature, and it is a network that can efficiently process the most input features as compared with other existing benchmark models.

The existing methods 1 to 3 (SingleRNN, MultiRNN, and SERNN) have something in common in using the VGG as a visual encoder.

The existing method 1 (SingleRNN) is a method for concatenating the bounding box information and the ego-vehicle speed information into one vector, and showed the performance of 0.76/0.64/0.45 that were the lowest values of accuracy/AUC/F1. The existing method 2 (MultiRNN) is a method for outputting the prediction uncertainty through comparison of the performances in case that respective input features were removed one by one in an embodiment of the present disclosure. In this case, the input for the bounding box information exerted the biggest influence on the accuracy, and the low performance of 0.063/0.043/0.084 was shown. The input that exerted the smallest influence on the performance was the scene context feature, and only the performance degradation of about 0.010/0.004/0.013 was shown. Since whole area of the image, rather than fraction of the image, is used, it is determined that the influence does not exert large influence on the prediction performance. By this experiment, it can be concluded that all the input features listed in Table 4 contribute to accuracy of pedestrian behavior prediction.

[TABLE 4

| P | L | S | LC | GC | SC | B | R | ACC | AUC | F1 | Precision | Recall |
|---|---|---|----|----|----|---|---|-----|-----|----|-----------|--------|
| ✓ | ✓ | ✓ | ✓ | ✓ | ✓ | ✓ | ✓ | 0.911 | 0.888 | 0.843 | 0.851 | 0.834 |
|   | ✓ | ✓ | ✓ | ✓ | ✓ | ✓ | ✓ | 0.855 (−0.0065) | 0.871 (−0.0017) | 0.782 (−0.0061) | 0.686 (−0.165) | 0.910 (+0.076) |
| ✓ |   | ✓ | ✓ | ✓ | ✓ | ✓ | ✓ | 0.848 (−0.0063) | 0.845 (−0.0043) | 0.759 (−0.0084) | 0.693 (−0.158) | 0.839 (+0.005) |
| ✓ | ✓ |   | ✓ | ✓ | ✓ | ✓ | ✓ | 0.857 (−0.0054) | 0.836 (−0.0052) | 0.758 (−0.0085) | 0.730 (−0.121) | 0.789 (−0.045) |
| ✓ | ✓ | ✓ |   | ✓ | ✓ | ✓ | ✓ | 0.887 (−0.0024) | 0.868 (−0.0020) | 0.806 (−0.0037) | 0.788 (−0.063) | 0.824 (−0.010) |
| ✓ | ✓ | ✓ | ✓ |   | ✓ | ✓ | ✓ | 0.898 (−0.0013) | 0.876 (−0.0012) | 0.822 (−0.0021) | 0.820 (−0.031) | 0.824 (−0.010) |
| ✓ | ✓ | ✓ | ✓ | ✓ |   | ✓ | ✓ | 0.901 (−0.0010) | 0.884 (−0.0004) | 0.830 (−0.0013) | 0.816 (−0.035) | 0.844 (+0.010) |
| ✓ | ✓ | ✓ | ✓ | ✓ | ✓ |   | ✓ | 0.888 (−0.0023) | 0.879 (−0.0009) | 0.814 (−0.0029) | 0.773 (−0.078) | 0.859 (+0.025) |
| ✓ | ✓ | ✓ | ✓ | ✓ | ✓ | ✓ |   | 0.859 (−0.0052) | 0.876 (−0.0012) | 0.788 (−0.0055) | 0.692 (−0.159) | 0.915 (+0.081) |

Bayesian modeling, and showed a relatively good performance 0.86/0.80/0.73 by using only four input features. The existing method 3 (SFRNN) is a method that utilizes the hidden state of the lower layer RNN as an input of the upper layer RNN.

The existing methods 4 Probabilistic Control Performance Assessment (PCPA) and 5 (MCIP) extracted the resultant values for C3D, I3D, and VGG with visual encoders.

The existing method 4 (PCPA) showed the lowest performance of 0.86/0.85/0.77 in case of using the C3D as a visual encoder, and showed the highest performance of 0.87/0.86/0.79 in case of encoding through the Inflated 3D Network (I3D). The existing method 5 (MCIP) used a total of 5 inputs including the input features used in the existing method 4 (PCPA) and an additional segmentation map input. Further, unlike the existing method 4 (PCPA), the lowest performance of 0.85/0.81/0.74 was shown in case of encoding by the I3D, and the highest performance of 0.89/0.87/0.81 was shown in case of encoding by the VGG.

In contrast, in an embodiment of the present disclosure, the visual input feature data was divided into two groups, and encoding was performed by the VGG with respect to one group, and encoding was performed by the C3D with respect to the remaining group. Further, the network was designed to perform efficient processing by using 8 input features, being the most inputs in comparison to those of the existing methods. The performance of 0.91/0.89/0.84, being the highest value in comparison to that of the existing benchmark methods, was shown to prove an advantage of the present disclosure.

Table 4 below shows the result in which respective inputs exerted an influence on the overall performance through Further, according to an embodiment of the present disclosure, the visual inputs are divided into two groups according to the features, and encoding is performed by the VGG and C3D. Table 5 shows that the performance is degraded in case of encoding by the VGG with respect to the inputs of the C3D group. It can be identified that the lowest degradation corresponds to the degradation of about 0.02/0.02/0.03. Accordingly, it is shown that separate application of visual encoding through division for each group proposed in the present disclosure is an effective method to increase the prediction performance.

TABLE 5

| Model | VGG | C3D | ACC | AUC | F1 |
|-------|-----|-----|-----|-----|----|
| CIPF-BR | LC, GC, SC, B, R | | 0.90 | 0.88 | 0.82 |
| CIPF-B | LC, GC, SC, B | B | 0.90 | 0.89 | 0.83 |
| CIPF-R | LC, GC, SC, R | B | 0.89 | 0.87 | 0.81 |
| CIPF | LC, GC, SC | B, R | 0.91 | 0.89 | 0.84 |

Table 6 shows the result in which the performances were compared with each other with respect to a model applied to the system proposed in an embodiment of the present disclosure and the existing model while the prediction time is changed from 1 second to four seconds. In all experimental setups, the model according to the present disclosure showed consistently better performance that the existing model. The biggest difference in performance occurred was predicted 1 second later, and the accuracy/AUF/F1-score of the model according to the present disclosure was improved to 0.02/0.02/0.03 as compared to the existing model.

TABLE 6

| | Existing Model | | | Present Disclosure Model | | |
|---|---|---|---|---|---|---|
| Time | ACC | AUC | F1 | ACC | AUC | F1 |
| 4 s | 0.78 | 0.74 | 0.62 | 0.78 | 0.74 | 0.61 |
| 3 s | 0.79 | 0.77 | 0.66 | 0.8 | 0.8 | 0.7 |
| 2 s | 0.83 | 0.81 | 0.72 | 0.84 | 0.83 | 0.74 |
| 1 s | 0.89 | 0.87 | 0.81 | 0.91 | 0.89 | 0.84 |

Further, according to an embodiment of the present disclosure, the annotation included in the existing dataset was added, expanded, and used for learning by using the automatic labeling technique. Table 7 shows the experimental result in which the easiness of the auto labeling technique according to an embodiment of the present disclosure could be identified, and the performance comparison was conducted with respect to a human correction version against the dataset (auto label) version in which only the automatically labelled dataset and human annotated dataset. As shown in Table 7, the auto labeling technique according to the present disclosure showed the negligible performance degradation of about 0.01/0.00/0.01 based on the accuracy/AUC/F1-score, in comparison to Human Corrected dataset. Thus it can be concluded that sufficient performance can be achieved by auto-labelled dataset.

TABLE 7

| Dataset | ACC | AUC | F1 | Precision | Recall |
|---|---|---|---|---|---|
| Auto Label | 0.88 | 0.85 | 0.92 | 0.95 | 0.90 |
| Human Correction | 0.89 | 0.85 | 0.93 | 0.95 | 0.91 |

Table 8 shows the performance comparison in accordance with the auto-labeled data increase. Table 8 shows tendency of performance metrics while the number of auto-labeled data s increased so that total number of data samples are increased from 60 samples to up to 140 samples. When the number of training sets is 60, the accuracy/AUC/F1-score were 0.78/0.76/0.85 respectively. As the number of training sets was gradually increased by using more auto-labelled samples, the performance was gradually improved, so that when the number of training sets is 140, the accuracy/AUC/F1-score reached 0.88/0.85/0.92 that was the highest performance. From this experiment, it is safe to conclude that auto-labeled data effectively improves performance of pedestrian behavior prediction.

TABLE 8

| # of train set | ACC | AUC | F1 | Precision | Recall |
|---|---|---|---|---|---|
| 60 | 0.78 | 0.76 | 0.85 | 0.92 | 0.79 |
| 80 | 0.79 | 0.80 | 0.86 | 0.94 | 0.79 |
| 100 | 0.83 | 0.85 | 0.89 | 0.96 | 0.82 |
| 120 | 0.86 | 0.84 | 0.91 | 0.95 | 0.87 |
| 140 | 0.88 | 0.85 | 0.92 | 0.95 | 0.90 |

FIG. 21 shows the quantitative analysis with respect to the result of executing the model proposed in the present disclosure in National Information Society Agency (NIA) dataset (children's road walking risky behavior video in children's protection zone). A solid-line box means that the pedestrian is predicted as safe, and a dotted-line box means that the pedestrian is predicted as vulnerable to accident. In Case 1 (2110), when a student who was crossing the crosswalk was within the crosswalk, the student was predicted as vulnerable to accident, but as the student got closer to the sidewalk, the student was predicted as safe. In Case 2 (2120), two students were predicted as vulnerable to accident as they entered the roadway. Last, in Case 3 (2130), when one student ran from the children's protection zone to the roadway, the student was predicted as vulnerable to accident, and when the student crossed the sidewalk, the student was predicted as safe. Thus, according to the present disclosure, it can be identified that the pedestrian vulnerability is correctly predicted in advance.

FIG. 22 shows the quantitative analysis with respect to the result of executing the model proposed in the present disclosure in PIE dataset (video of the pedestrian's behavior captured in the vehicle). On the contrary to FIG. 20, a dotted-line box represents a pedestrian predicted as vulnerable to accident, and a solid-line box designates a pedestrian predicted as safe. In Case 1 (2210), a pedestrian who intends to enter the roadway is continuously predicted as a vulnerable to accident. In Case 2 (2220), a pedestrian who enters the crosswalk is first predicted as vulnerable to accident, but as the pedestrian gradually stops, the predicted status changed to safe. In Case 3 (2230), as a pedestrian who is in the roadway goes up to the sidewalk, the pedestrian is continuously predicted as safe. Accordingly, it can be identified that the pedestrian vulnerability is correctly predicted in advance even with respect to the video captured by cameras mounted on moving vehicles.

Figure 23:
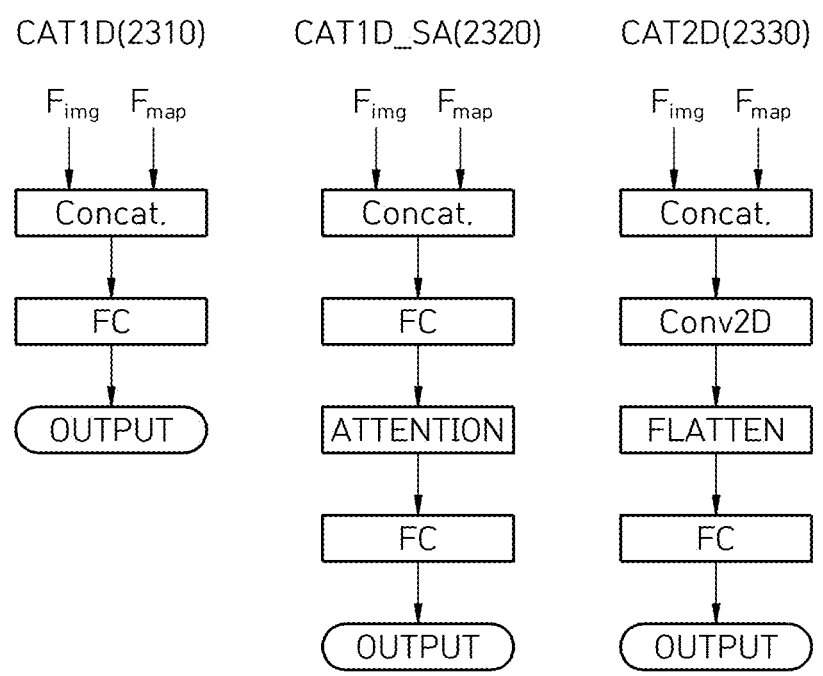
FIG. 23 is a diagram illustrating examples of a feature fusing method in the related art.

FIG. 23 is a diagram illustrating examples of a feature fusing method in the related art. FIG. 23 illustrates an example of the pedestrian risk assessment result in an embodiment of the present disclosure. CAT1D (2310) concatenates $F_{img}$ and $F_{map}$, and then passes them through the Fully Connected (FC) layer to obtain an output value. CAT1D_SA (2320) concatenates $F_{img}$ and $F_{map}$, passes them through the FC layer, and then sequentially passes them through the attention layer and FC layer to obtain an output value. CAT2D (2330) concatenates $F_{img}$ and $F_{map}$, passes them through the Conv2D layer, and then sequentially passes them through the Flatten layer and FC layer to obtain the output value.

In order to evaluate the quantitative performance according to an embodiment of the present disclosure, 200 video clips (30 seconds each) were used in "Children's road walking risky behavior vides in children's protection zone" provided by AI Hub. From the corresponding video, 71,898 risky situation ROIs and 68,181 safe situation ROIs were generated, and evaluated with partitioning the video clips into 100 training sets and 100 testing sets. For performance metrics, Accuracy (ACC), Precision, Recall, F1 score, and Area under the ROC curve (AUC) were employed.

In this case, Accuracy, Precision, and Recall are defined as in Equations 19 to 21 below.

$$ACC = \frac{TP + TN}{TP + TN + FP + FN} \qquad \text{[Equation 19]}$$

$$Precision = \frac{TP}{TP + FP} \qquad \text{[Equation 20]}$$

$$Recall = \frac{TP}{TP + FN} \qquad \text{[Equation 21]}$$

In this case, TP means the number of true positive samples, TN means the number of true negative samples, FP means the number of false positive samples, and FN means the number of false negative samples.

The F1 score is a harmonic mean of precision and recall, and provide a balanced evaluation value for the model performance.

$$F1 = \frac{2 \times \text{precision} \times \text{recall}}{\text{precision} + \text{recall}} \qquad \text{[Equation 22]}$$

The AUC is an area of an ROC curve bottom area, and is defined as in Equation 23 below.

$$AUC_{(p)} = \frac{\Sigma_{s_0 \in S^0} \Sigma_{s_1 \in S^1} 1[p(s_0) < p(s_1)]}{|S^0| \cdot |S^1|} \qquad \text{[Equation 23]}$$

Here, p denotes a safety situation probability for the corresponding sample, $1[f(\bullet)]$ is a function which is 1 when a built-in function is true, and which is 0 when the built-in function is false, $S^0$ is a negative sample set, $S^1$ is a positive sample set.

Through an embodiment of the present disclosure, feature fusing methods as in FIG. 23 were implemented for comparison of the accuracy of the judgment of the pedestrian risky situation by fusion of multiple information features with that according to other conventional methods often used for fusion.

In this case, the 1D feature vector $f_{img}$, $f_{map}$ is obtained by applying 2D global average pooling to the feature map $F_{img}$, $F_{map}$.

As shown in the experimental results in Table 9, the semantic feature fusing of the ground showed better performance than the that obtained by use of only video frame (IMG ONLY). Further, it was identified that using the 2D feature map, instead of the 1D feature vector, is essential to classification accuracy as 2D feature map maintains spatial information of the scene. Last, it can be concluded that the feature fusion method according to an embodiment of the present disclosure showed the best performance.

TABLE 9

| Model | ACC | AUC | F1 | Precision | Recall |
|---|---|---|---|---|---|
| IMG_ONLY | 0.739 | 0.802 | 0.659 | 0.606 | 0.724 |
| CAT1D (2310) | 0.846 | 0.896 | 0.738 | 0.908 | 0.622 |
| CAT1D_SA (2320) | 0.834 | 0.864 | 0.706 | 0.924 | 0.571 |
| CAT2D(2330) | 0.854 | 0.882 | 0.871 | 0.821 | 0.744 |
| Our PedRiskNet | 0.888 | 0.908 | 0.839 | 0.840 | 0.838 |

Figure 24:
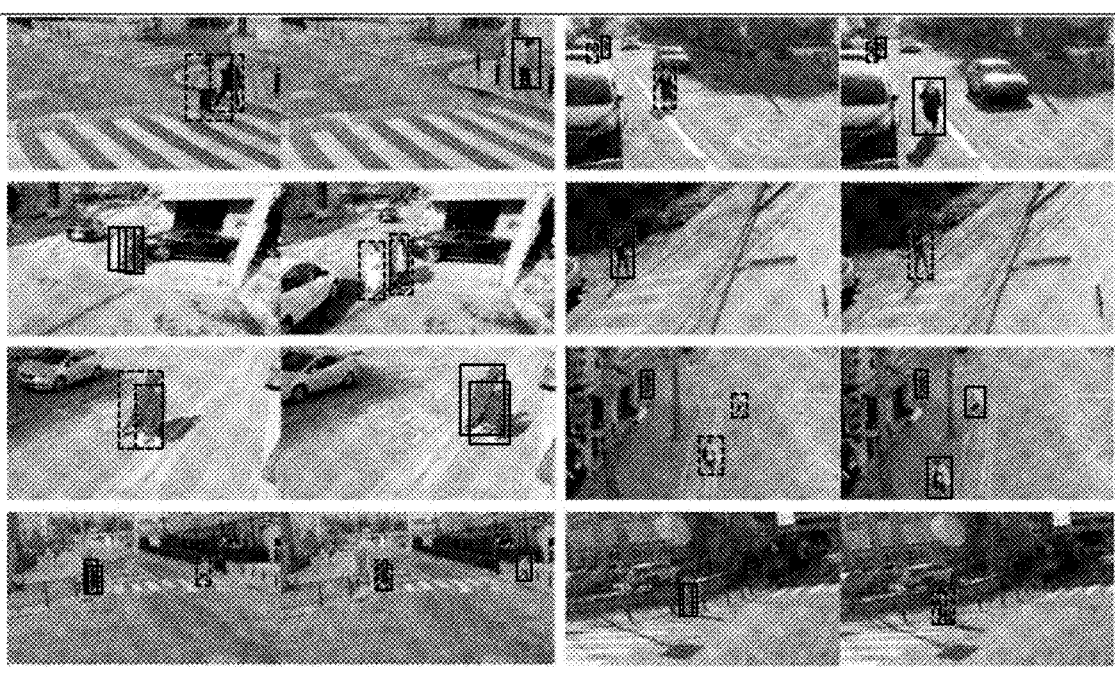
FIG. 24 is a diagram showing an example of a pedestrian risk estimation result according to an embodiment of the present disclosure.

In FIG. 24, the pedestrian risk assessment is illustrated by a bounding box, and a solid line denotes the safe state (2410), and a dotted line denotes the risky state (2420). In FIG. 24, pairs of videos represent cases of transition of pedestrians' potential risk, and it can be lead to conclusion that according to an embodiment of the present disclosure, the pedestrian risk assessment is correctly performed.

An embodiment of the present disclosure described above may be implemented as a program (or application) to be executed in combination with a hardware computer, and may be stored in a medium.

In order for the computer to read the above-described program so as to execute the above methods implemented as the program, the program may include a code coded by a computer language, such as C, C++, JAVA, Ruby, and machine language, which can be read by a processor (CPU) of the computer through a device interface of the computer.

Such a code may include a functional code related to a function that defines functions necessary to execute the above methods, and may include a control code related to an execution procedure necessary for the processor of the computer to execute the above functions according to a specific procedure. Further, such a code may further include a memory reference related code regarding at which location (address) of an internal or external memory of the computer additional information or media necessary for the processor of the computer to execute the above functions is to be referred to. Further, in case that the processor of the computer is required to communicate with any other remote computer or server to execute the above functions, the code may further include a communication related code regarding how to communicate with any other remote computer or server by using a communication module of the computer, or which information or medium is to be transmitted/received during the communication.

The storage medium means a medium which semi-permanently stores data and which can be read by a device, rather than a medium which stores data for a brief moment, such as a register, cache, or memory. Specific examples of the storage medium include ROM, RAM, CD-ROM, magnetic tape, floppy disc, and optical data storage device, but are not limited thereto. That is, the program may be stored in various recording media on various servers that can be accessed by the computer, or various recording media on a user's computer. Further, the medium may be distributed in a computer system connected through a network, and may store a code that can be read by the computer in a distributed manner.

The above explanation of the present disclosure is for illustrative purposes, and it can be understood by those of ordinary skill in the art to which the present disclosure pertains that the present disclosure can be easily modified in other specific forms without changing the technical idea or essential features of the present disclosure. Accordingly, it should be understood that the above-described embodiments are illustrative in all aspects, not restrictive. For example, each constituent element explained as a single type may be distributed and carried out, and in the same manner, constituent elements explained as being distributed may be carried out in a combined form.

The scope of the present disclosure is defined by the appended claims to be described later rather than the above-described detailed description, and all changes or modifications derived from the meanings, scope, and equivalent concept of the claims should be interpreted as being included in the scope of the present disclosure.

What is claimed is:

1. A method performed by a computer for predicting pedestrian safety information based on video, the method comprising the steps of:

generating pedestrian trajectory prediction data based on video input;

generating pedestrian behavior prediction data based on the video input; and estimating risk to pedestrian safety based on the trajectory prediction data, the behavior prediction data, and a surface classification data for the video input, wherein the step of generating the pedestrian behavior prediction data based on the video input comprises the steps of:

setting video input for a predetermined time from the present to the past as an observation target video;

extracting multiple visual input feature data and non-visual input feature data from the observation target video;

grouping the multiple visual input feature data and the non-visual input feature data; and inputting the grouped feature data to separated processing modules and generating the pedestrian behavior prediction data based on output results of the processing modules;

wherein the step of extracting the multiple visual input feature data and the non-visual input feature data from the observation target video and vehicle dynamics sensors comprises the steps of:

extracting pedestrian posture feature data, a pedestrian bounding box, and vehicle dynamics data as the non-visual input feature data; and extracting, as the visual input feature data, local context feature that is an image having a predetermined multiple size of the bounding box, global context feature including video segmentation data, scene context feature data including entire area in the video input, a pedestrian area obtained from the video input, and a pedestrian-surrounding area in the video input from which the pedestrian area is removed;

wherein the step of grouping the multiple visual input feature data and the non-visual input feature data comprises the steps of:

generating first feature data group consists of the pedestrian posture feature data, the pedestrian bounding box, and the vehicle dynamics data;

generating second feature data group consists of the local context feature that is the image having the predetermined size surrounding the bounding box, the global context feature including the video segmentation data, and the scene context feature including the entire area of the video input; and generating third feature data group consists of the pedestrian area obtained from the video input and the pedestrian-surrounding area in the video from which the pedestrian area is removed from the video;

wherein the step of generating the pedestrian behavior prediction data by inputting the grouped feature data to the separated processing modules and concatenating the output results of the respective processing modules comprises the steps of:

inputting the local context feature data, the global context feature data, and the scene context feature data to a CNN;

inputting visual feature data for the local context feature data, the global context feature data, and the scene context feature data from the CNNs to first to third recurrent neural network modules; and concatenating and inputting, to a fourth recurrent neural network module, the feature encoding for the local context feature, the global context feature, and the scene context feature output from the first to third recurrent neural network modules.

2. The method of claim 1, wherein the step of generating the pedestrian trajectory prediction data based on the video input comprises the steps of:

providing a recurrent encoder with a pedestrian's past trajectory data corresponding in the video input and a visual feature data by inputting the video input and the pedestrian's past trajectory data to the first attentive visual feature module based on the attention mechanism; and

outputting the visual feature data for a future pedestrian trajectory prediction by inputting the video data and a past state feature vector extracted from the recurrent encoder to the second attentive visual feature module.

3. The method of claim 2, wherein the step of generating the pedestrian trajectory prediction data based on the video input comprises the steps of:

outputting a pedestrian past state feature vector by inputting the past trajectory of the pedestrian, visual feature data to the recurrent encoder; and generating the pedestrian trajectory prediction data by inputting the visual feature data to a recurrent decoder.

4. The method of claim 1, wherein the step of generating the pedestrian behavior prediction data by inputting the grouped feature data to the separated processing modules and concatenating the output results of the respective processing modules comprises the steps of:

inputting the pedestrian posture feature data to a first recurrent neural network module;

obtaining the feature encoding for the pedestrian posture feature data from the first recurrent neural network module;

inputting, to a second recurrent neural network module, the feature encoding for the pedestrian posture feature data and the pedestrian bounding box information;

obtaining the feature encoding for the pedestrian posture feature data and the pedestrian bounding box from the second recurrent neural network module;

inputting the vehicle dynamics data and the feature encoding for the pedestrian posture feature data and the pedestrian bounding box to a third recurrent neural network module; and obtaining the feature encoding for the posture feature data corresponding to the pedestrian, the pedestrian bounding box, and vehicle dynamics data from the third recurrent neural network module.

5. The method of claim 1, wherein the step of generating the pedestrian behavior prediction data by inputting the grouped feature data to the separated processing modules and concatenating the output results of the respective processing modules comprises the steps of:

inputting the pedestrian area obtained from the video input and the pedestrian-surrounding area in the video from which the pedestrian area is removed to respective 3D convolutional networks;

reducing dimensions of feature maps obtained from respective 3D convolutional networks by the feature maps to respective max pooling layers;

converting each dimension-reduced feature maps into a one-dimensional vector and then transferring the converted vector to a fully connected layer; and generating passing a result of concatenating input/output neurons to a neural network.

6. The method of claim 1, wherein the step of generating the pedestrian behavior prediction data by inputting the grouped feature data to the separated processing modules and concatenating the output results of the respective processing modules comprises the steps of:

inputting the feature encoding from an observational module to a first attention module;

inputting the feature encoding from a contextual module to a second attention module;

inputting, to a third attention module, an output result of the second attention module after being concatenated with the feature encoding from a convolutional module; and generating the pedestrian behavior prediction data by concatenating the feature encodings from the first and the third attention modules and then inputting the concatenated feature to a fourth attention module.

7. The method of claim 1, wherein the step of estimating the risk based on the trajectory prediction data, the behavior prediction data, and the surface classification result for the video input comprises the steps of:

generating segmentation maps by performing semantic segmentation for the video input;

generating a ground area map by identifying a ground area using the segmentation maps; and estimating the pedestrian risk based on a pedestrian-surrounding area in the video that is an area surrounding the bounding box corresponding to the pedestrian in the video input and the ground area map.

8. The method of claim 7, wherein the step of generating the ground area map by identifying the ground area using the segmentation maps comprises the steps of:

generating a ground area mask in which pixels belonging to the ground area is set to true;

calculating a cumulative probability for the ground area in accordance with time by applying the ground area mask to the segmentation map; and generating the ground area map indicating what ground area each pixel belongs to based on the cumulative probability.

9. The method of claim 7, wherein the step of estimating the risk based on the trajectory prediction data, the behavior prediction data, and the surface classification result in the video input comprises the step of extracting a pedestrian-surrounding area from the video and the bounding box, wherein the step of extracting the pedestrian-surrounding area in the video includes the steps of:

extracting a first feature map including a visual feature for pedestrian surroundings based on the video and the bounding box; and extracting a second feature map including a ground feature for the pedestrian and the pedestrian surroundings based on the video, the bounding box, and the ground area map.

10. The method of claim 9, wherein the step of extracting the first feature map comprises the steps of:

generating a first cropped video from the video input by cropping an area including the bounding box corresponding to a pedestrian with a predetermined multiple of the size of the bounding box;

removing the area corresponding to the bounding box from the first cropped video; and extracting the first feature map including the visual feature for the pedestrian surroundings by inputting the video from which the area corresponding to the bounding box is removed to a pre-trained visual feature extraction network.

11. The method of claim 10, wherein the step of extracting the second feature map comprises the steps of:

generating a second cropped video by converting the ground area maps into an RGB video and then cropping the same area as the area of the first cropped video;

extracting the second feature map including a ground feature for the pedestrian area and the pedestrian-surrounding area by inputting the second cropped video to a pre-trained road area feature extraction network; and outputting the probability-based pedestrian risk by concatenating the first and second feature maps.

12. The method of claim 7, wherein the step of estimating the risk based on the trajectory prediction data, the behavior prediction data, and the surface classification result in the video input further comprises the step of estimating semantic location data for the pedestrian based on the bounding box and the ground area map.

13. The method of claim 12, wherein the step of estimating the semantic location data for the pedestrian based on the bounding box and the ground area map comprises the steps of:

estimating a pedestrian foot area from the bounding box; and estimating a class corresponding to the most pixels on the ground area map that contacts the pedestrian foot area as the semantic location data for the pedestrian.

14. The method of claim 13, wherein the step of estimating the pedestrian foot area from the bounding box estimates a bottom area having a predetermined ratio of the size of the bounding box size as the pedestrian foot area.

15. A system for predicting pedestrian safety information based on video, the system comprising:

a communication module for receiving video input captured through a camera installed in a predetermined location;

a memory for storing a program to estimate a pedestrian risk based on the captured video input; and a processor, through execution of the program stored in the memory, for generating pedestrian trajectory prediction data based on the video input, for generating pedestrian behavior prediction data based on the video input, and estimating the risk to pedestrian safety based on the trajectory prediction data, the behavior prediction data, and a surface classification result in the video input;

wherein the step of generating the pedestrian behavior prediction data based on the video input comprises the steps of:

setting video input for a predetermined time from the present to the past as an observation target video;

extracting multiple visual input feature data and non-visual input feature data from the observation target video;

grouping the multiple visual input feature data and the non-visual input feature data; and inputting the grouped feature data to separated processing modules and generating the pedestrian behavior prediction data based on output results of the processing modules;

wherein the step of extracting the multiple visual input feature data and the non-visual input feature data from the observation target video and vehicle dynamics sensors comprises the steps of:

extracting pedestrian posture feature data, a pedestrian bounding box, and vehicle dynamics data as the non-visual input feature data; and extracting, as the visual input feature data, local context feature that is an image having a predetermined multiple size of the bounding box, global context feature including video segmentation data, scene context feature data including entire area in the video input, a pedestrian area obtained from the video input, and a pedestrian-surrounding area in the video input from which the pedestrian area is removed;

wherein the step of grouping the multiple visual input feature data and the non-visual input feature data comprises the steps of:

generating first feature data group consists of the pedestrian posture feature data, the pedestrian bounding box, and the vehicle dynamics data;

generating second feature data group consists of the local context feature that is the image having the predetermined size surrounding the bounding box, the global context feature including the video segmentation data, and the scene context feature including the entire area of the video input; and generating third feature data group consists of the pedestrian area obtained from the video input and the pedestrian-surrounding area in the video from which the pedestrian area is removed from the video;

wherein the step of generating the pedestrian behavior prediction data by inputting the grouped feature data to the separated processing modules and concatenating the output results of the respective processing modules comprises the steps of:

inputting the local context feature data, the global context feature data, and the scene context feature data to a CNN;

inputting visual feature data for the local context feature data, the global context feature data, and the scene context feature data from the CNNs to first to third recurrent neural network modules; and concatenating and inputting, to a fourth recurrent neural network module, the feature encoding for the local context feature, the global context feature, and the scene context feature output from the first to third recurrent neural network modules.

16. A system for predicting pedestrian safety information based on video, the system comprising:

a communication module for receiving video input captured through a camera installed in a predetermined location;

a memory for storing a program to estimate a pedestrian risk based on the captured video input; and a processor, through execution of the program stored in the memory, for:

extracting visual feature data for future pedestrian trajectory prediction based on the video input and generating pedestrian trajectory prediction data by inputting the visual feature data to recurrent encoder and decoder, extracting multiple visual input feature data and non-visual input feature data from the video input and from vehicle dynamics sensors and generating pedestrian behavior prediction data by grouping and inputting the respective extracted input feature data to respective processing modules and then concatenating output results, and estimating pedestrian semantic location data and the risk to pedestrian safety based on the trajectory prediction data, the behavior prediction data, and a surface classification result for the video input;

wherein the step of generating the pedestrian behavior prediction data based on the video input comprises the steps of:

setting video input for a predetermined time from the present to the past as an observation target video;

extracting multiple visual input feature data and non-visual input feature data from the observation target video;

grouping the multiple visual input feature data and the non-visual input feature data; and inputting the grouped feature data to separated processing modules and generating the pedestrian behavior prediction data based on output results of the processing modules;

wherein the step of extracting the multiple visual input feature data and the non-visual input feature data from the observation target video and vehicle dynamics sensors comprises the steps of:

extracting pedestrian posture feature data, a pedestrian bounding box, and vehicle dynamics data as the non-visual input feature data; and extracting, as the visual input feature data, local context feature that is an image having a predetermined multiple size of the bounding box, global context feature including video segmentation data, scene context feature data including entire area in the video input, a pedestrian area obtained from the video input, and a pedestrian-surrounding area in the video input from which the pedestrian area is removed;

wherein the step of grouping the multiple visual input feature data and the non-visual input feature data comprises the steps of:

generating first feature data group consists of the pedestrian posture feature data, the pedestrian bounding box, and the vehicle dynamics data;

generating second feature data group consists of the local context feature that is the image having the predetermined size surrounding the bounding box, the global context feature including the video segmentation data, and the scene context feature including the entire area of the video input; and generating third feature data group consists of the pedestrian area obtained from the video input and the pedestrian-surrounding area in the video from which the pedestrian area is removed from the video;

wherein the step of generating the pedestrian behavior prediction data by inputting the grouped feature data to the separated processing modules and concatenating the output results of the respective processing modules comprises the steps of:

inputting the local context feature data, the global context feature data, and the scene context feature data to a CNN;

inputting visual feature data for the local context feature data, the global context feature data, and the scene context feature data from the CNNs to first to third recurrent neural network modules; and concatenating and inputting, to a fourth recurrent neural network module, the feature encoding for the local context feature, the global context feature, and the scene context feature output from the first to third recurrent neural network modules.

* * * * *